(12) United States Patent
Kuwajima et al.

(10) Patent No.: US 8,048,228 B2
(45) Date of Patent: Nov. 1, 2011

(54) MASKING APPARATUS AND METHOD OF FABRICATING ELECTRONIC COMPONENT

(75) Inventors: Hajime Kuwajima, Tokyo (JP); Hitoshi Ohkubo, Tokyo (JP)

(73) Assignee: TDK Corporation, Tokyo (JP)

( * ) Notice: Subject to any disclaimer, the term of this patent is extended or adjusted under 35 U.S.C. 154(b) by 1040 days.

(21) Appl. No.: 11/925,249

(22) Filed: Oct. 26, 2007

(65) Prior Publication Data

US 2008/0107873 A1   May 8, 2008

(30) Foreign Application Priority Data

Oct. 27, 2006   (JP) ................ 2006-293245

(51) Int. Cl.
*C23C 16/00* (2006.01)
*C23F 1/00* (2006.01)
*H01L 21/306* (2006.01)

(52) U.S. Cl. ........ 118/721; 118/720; 118/504; 118/505; 118/506; 118/728; 118/729; 156/345.51; 156/345.52; 156/345.53; 156/345.54; 156/345.55

(58) Field of Classification Search ............ 118/720, 118/721, 301, 504–506, 728, 729
See application file for complete search history.

(56) References Cited

U.S. PATENT DOCUMENTS

| 6,540,839 B1 * | 4/2003 | Lee et al. ............... 118/724 |
| 2004/0089940 A1 * | 5/2004 | Mamitsu et al. ........... 257/718 |

FOREIGN PATENT DOCUMENTS

| JP | 413858 | | 1/1992 |
| JP | 7-66088 | | 3/1995 |
| JP | 8-124813 | | 5/1996 |
| JP | 09-125244 | * | 5/1997 |
| JP | 09-202959 | * | 8/1997 |
| JP | 2001-89840 | | 4/2001 |

* cited by examiner

*Primary Examiner* — Parviz Hassanzadeh
*Assistant Examiner* — Rakesh Dhingra
(74) *Attorney, Agent, or Firm* — Oblon, Spivak, McClelland, Maier & Neustadt, L.L.P.

(57) ABSTRACT

A masking apparatus includes a mask base body and a mask plate. The mask base body includes at least one spacer plate, and a cavity in which an electronic component can be housed. The mask plate is disposed on an upper surface and/or a lower surface of the mask base body. The mask plate includes a film-forming opening with a shape corresponding to the shape of an external structural body to be formed on an outer surface of the component. The mask plate thus allows a film-forming operation to be selectively performed on the outer surface of the component through the film-forming opening. The cavity includes, in an inner surface thereof, a film-forming groove communicating with the film-forming opening so that the external structural body can be formed at once on an upper surface and/or a lower surface of, and also on a peripheral surface of the component.

13 Claims, 15 Drawing Sheets

MASKING APPARATUS AND METHOD OF FABRICATING ELECTRONIC COMPONENT

BACKGROUND OF THE INVENTION

The present invention relates to a masking apparatus and a method of fabricating an electronic component, and particularly relates to a masking technique for forming an external structural body, such as a terminal electrode, on an outer peripheral surface of a chip-type electronic component.

Various electronic components are available today, such as: various discrete components including chip capacitors, chip inductors and chip resistors; and various electronic devices in each of which a plurality of active and/or passive elements are combined. Any of these electronic components needs terminal electrodes for establishing an electrical and mechanical connection with the outside so as to be mounted on a wiring board.

Such a terminal electrode can be formed by firstly forming a base electrode by a vapor deposition method such as sputtering, and by then plating a main conductor layer, which will serve as a main layer of the electrode, on the base electrode. For forming the base electrode, a masking apparatus is used in order to selectively form films on surfaces, on which electrodes are to be formed, of a component. This masking apparatus generally includes a mask base body and a mask plate. The mask base body holds individual chip-type electronic components obtained by dicing, while the mask plate includes a film-forming opening formed therein and corresponding to the shape of an electrode to be formed. A chip-type electronic component (hereinafter, sometimes referred to simply as a chip) is housed in a cavity of the mask base body in a state where a surface, to be processed, of the chip faces up. Then, the mask plate is placed on the top of the cavity (the mask base body), and a film-forming process is then carried out.

Not only a vapor deposition method, but also other film-forming methods, such as a paste printing method in which a conductive paste is applied, an ink jet method, and a transfer method, are widely used for forming such electrodes.

What is formed on an outer surface of a chip is not limited to the terminal electrode for external connection, and various film-shaped structures (external structural bodies) are also formed thereon. Such film-shaped structures include a connection pad used for mounting another element on the chip, wiring arranged on the outer surface of the chip. Moreover, the film-shaped structures to be formed thereon also include an insulating film that is selectively disposed for forming wiring on the outer surface of the conductive chip of a semiconductor or a metallic plate.

A masking apparatus is disclosed, for instance, in Japanese Patent Unexamined Application Publication No. Hei 4-13858.

SUMMARY OF THE INVENTION

When an external structural body, such as a terminal electrode, is provided on the outer surface of a chip, the external structural body often needs to be continuously formed on plural surfaces among the top surface (the front surface), the bottom surface (the back surface), and the peripheral surfaces (the end surfaces and side surfaces) of the chip. Examples of such case include a case where a top-surface electrode and a bottom-surface electrode of a chip is connected to each other via an electrode disposed on a peripheral surface of the chip, and a case where an electrode is drawn out from an internal wiring layer of a chip to the peripheral surface of the chip, and is then connected to an electrode on the top surface or the bottom surface of the chip.

Conventionally, it has been necessary that a film-forming process be performed on each surface one by one for continuously forming an electrode on plural surfaces. For example, when an electrode connecting a top-surface electrode and a bottom-surface electrode to each other is to be formed on the two end portions of a chip (see FIG. 1 to be described later), the film-forming process needs to be performed four times in total, for example, (1) on the top surface, (2) on the bottom surface, (3) on one of the end surfaces, and then (4) on the other one of the end surfaces. When connection electrodes of the same type are to be formed respectively on the two end portions and the two side portions (all the peripheral surface portions) of a chip (see FIG. 8 to be described later), the film-forming process needs to be performed six times in total, for example, (1) on a top surface, (2) on a bottom surface, (3) on one of the end surfaces (the shorter-side surfaces), (4) the other one of the end surfaces (the shorter-side surfaces), (5) one of the side surfaces (the longer-side surfaces), and then (6) on the other one of the side surfaces (the longer-side surfaces).

Moreover, the film-forming process to be performed on each surface individually requires a particular mask base body (a spacer plate) that holds the chip in particular attitude and direction, and a particular pattern mask (corresponding to the shape of an electrode to be formed) that is fixed on the front surface of the mask base body. Accordingly, it is complicated and requires substantial time to build a particular one of these mask main bodies and a particular one of these pattern masks for each surface, and to reload the chip for each time.

On the one hand, it is not impossible to perform a single film-forming process on plural surfaces (for example, on the top and bottom surfaces, as well as on the side surface) for the purpose of avoiding the complication of the process. For example, a chip is subjected in advance to a process of rounding (chamfering) an edge of the chip. When a conductive paste is applied to a first surface (for example, the side surface), the rounded edge allows the paste to spread along the rounded edge onto a second surface (for example, the top surface or the bottom surface). Accordingly, the paste can be applied also to the second surface at once.

However, it is practically difficult to uniformly round an edge of a chip with a high precision. Accordingly, it is difficult to control the amount of paste flowing over the edge portion onto the second surface, depending on the variation of roundness, or depending on the variations of pressure at the applying of the paste and on the variations of the viscosity of the paste. For this reason, the electrode formed on the second surface by utilizing the flow of the paste eventually has a quite poor dimensional precision in comparison with the first surface.

On the other hand, it is not preferable to repeatedly perform the film-forming process over and over, not only in terms of the complication of the film-forming process, but also in terms of the quality of the electrode to be formed, specifically, the mechanical and electrical bonding strengths, dimensional and positional precisions, and electrical characteristics (the potential resistance).

For example, when an electrode is formed by using a conductive paste, a drying process after the application of the paste also has to be repeatedly performed over and over. Accordingly, during the drying process, another exposed surface, where the paste has not yet been applied, of the internal wiring may possibly be oxidized, or an impurity, such as an organic matter, may possibly be attached to the bonding portion. As a result, the internal resistance of the bonding portion may be increased, and concurrently, the mechanical and electrical bonding strengths may be deteriorated. Moreover, also in a case where a base electrode is formed by a vapor deposition method, such as sputtering, the film-forming process still has to be performed sequentially on each of the outer surfaces at intervals. Accordingly, a similar problem may possibly occur in which exposed bonding surfaces are deteriorated during an interval between the processing of a first surface and the processing of a second surface.

Moreover, when a base electrode on a side surface (a side-surface electrode) is formed subsequent to electrodes (top-surface and bottom-surface electrodes) on the top and bottom surfaces of a chip, the side-surface electrode covers the top-surface electrode and the bottom-surface electrode in vicinities of the edges (the boundary portions each between the top surface (or the bottom surface) and the side surface/corners of the chip). For this reason, the base electrode is raised at the corresponding edge portions. When a main layer of the electrode is then formed on the edge portions by means of, for example, electroplating, the electric field is concentrated at the edge portions, so that the electrode film locally grows more than the other portions. Accordingly, a protruding portion of the electrode film is formed at the edge portions of the chip. As a result, not only a dimensional error of the electrode but also the following accident and the like may occur. The protruding portion gets stuck while being handled, so that the electrode film is eventually peeled off and damaged.

In addition, there is also a problem of the precision in positioning the chip at the time of film-forming. To be specific, the mask base body including the mask (the film-forming opening) and the cavity is rarely formed simply of a single plate, but normally has a structure in which plural thin metal plates are stacked on one another. The reason is as follows. The mask plate and the mask base body are generally fabricated of a metal plate, such as a stainless steel plate, while the film-forming opening and an opening of the cavity are formed by etching. However, when the thickness of the plate is large, openings cannot be formed with a sufficient accuracy by etching. As the thickness of the plate is smaller, a more favorable accuracy of the shapes of the openings can be achieved.

However, when the mask plate and the mask base body (the metal plates forming these components) are made thinner, these components are more likely to be deformed due to heat generated in a film-forming process, such as a sputtering process. As these components are repeatedly used, each of the metal plates forming the mask plate and the mask base body is buckled and undulated, so that a gap is formed between these plates. Accordingly, the electronic component may slide into the gap, and thus cannot be accurately positioned in the cavity. As a result, the accuracies in position and shape of the electrode to be formed are deteriorated.

Moreover, electronic components used for electronic devices have been drastically reduced in size and height along with a recent reduction in size of the electronic devices. While the accuracy requirements (accuracies in shape and in forming position) for terminal electrodes provided to electronic components are becoming more challenging, there is a tendency that the components themselves are being reduced in size and thickness. Accordingly, it is expected that the size and height of the electronic components will be further reduced. As a result of such reduction, the above-described problems associated with the conventional masking apparatus may be more serious in the future.

On the one hand, the above-described buckling and undulating of the metal plates have conventionally been prevented by providing a number of screws each penetrating the mask, and by fastening the entire mask with these screws so as to eliminate the gap in the mask. However, since putting in and taking out a number of these screws each time is complicated and deteriorates workability, this is not preferable in terms of productivity.

On the other hand, in the invention disclosed in Japanese Patent Unexamined Application Publication No. Hei 4-13858 that has been described above, a magnet is provided to a masking apparatus for eliminating such a screwing operation in order to solve the problem. However, since space for providing the magnet is required, the number of cavities formed in each one mask (the number of electronic components to be processed at once) is inevitably reduced. As a result, the productivity is reduced. Moreover, since magnets are so relatively brittle as to be cracked. Accordingly, as magnets are repeatedly attached and detached, a fragment of the magnet may enter the inside of a product (an electronic component) to be a contamination source.

In addition, in the apparatus disclosed in Japanese Patent Unexamined Application Publication No. Hei 4-13858, a lower mask plate $20c$ that is a non-magnetic body is interposed between a magnet $22$ (a magnet holding plate $20b$) and a magnetic body (a spacer $20d$ and an upper mask plate $20e$), so that the magnet $22$ and the magnetic body are spaced apart from each other. For this reason, the corrective force provided by only the magnet $22$ is not necessarily sufficient against the deformation (the buckling and undulation) of the mask and the spacer.

Moreover, suppose a case where electrodes are to be formed, in the above-described manner, in electronic components, which are mass products. In this case, for example, a several thousand of cavities are sometimes provided in a single masking apparatus (for a single terminal-film-forming process), and the electronic components are subjected to a film-forming process all together for the purpose of increasing the productivity. However, it is also necessary that chips are more briefly and efficiently housed respectively in a large number of these cavities, and are then positioned accurately (at a high probability) with respect to the mask.

In this respect, a first of object of the present invention is to reduce the number of manufacturing processes of an external structural body that is provided on an outer surface of an electronic component, by enabling the external structural body to be formed on a plurality of surfaces at once. A second object of the present invention is to achieve a favorable mechanical and electrical bonding condition. Moreover, a third object of the present invention is to make it possible to easily house an electronic component in a cavity of a masking apparatus, to then securely position the electronic component, and to thus form an electrode with a more accurate shape at a more accurate position.

For the purpose of solving the above-described problems to achieve the above-described objects, a masking apparatus according to the present invention has the following characteristics. The masking apparatus includes a mask base body and a mask plate. The mask base body includes at least one spacer plate, and also including a cavity in which an electronic component can be housed. The mask plate is disposed on one of, or each of, an upper surface and a lower surface of the mask base body. In addition, the mask plate includes a film-forming opening with a shape corresponding to the shape of an external structural body to be formed on an outer surface of the electronic component. The mask plate thus allows a film-forming operation to be selectively performed on the outer surface of the electronic component through the film-forming opening so that the external structural body can be formed. In the masking apparatus, the cavity has a depth dimension substantially equal to the height dimension of the electronic component in a state where the film is to be formed, so as to surround the periphery of the electronic component housed therein. Moreover, the cavity includes, in an inner surface thereof, a film-forming groove communicating with the film-forming opening. Accordingly, the external structural body can be formed at once both on at least one of an upper and a lower surfaces of, and on a peripheral surface of, the electronic component in the state where the film is to be formed.

In the masking apparatus according to the present invention, a chip (an electronic component) which is to be processed (to be subjected to a film-forming process) is housed in the cavity of the mask base body. Then, the mask plate is placed on the top of the mask base body, and a film is selectively formed on surfaces of the chip (the surfaces including all the outer surfaces of the chip, such as: a front surface, also referred to as a top surface or a upper surface; a back surface, also referred to as a bottom surface or a lower surface; and a peripheral surface, also referred to as a side surface or an end surface), so that an electrode is formed thereon. The opening (a film-forming opening) having a shape corresponding to the shape of the electrode to be formed is formed in the mask. A thin film which constitutes the electrode is formed through the film-forming opening. Specific film-forming methods may include, for example: a vapor deposition method (a dry deposition method), such as a sputtering method, an evaporation method, and a vapor growth method (a CVD method); an ink jet method; a paste printing method; and a transfer method.

The mask base body includes at least one spacer plate. The dimension of the depth of a cavity formed by the spacer plate is substantially equal to the height dimension of the electronic component in a state where a film is to be formed. In other words, in the masking apparatus according to the present invention, one or more spacer plates are stacked so that the total thickness (the height) of the spacers can be made substantially equal to the height of the electronic component in the state where a film is to be formed.

It should be noted that the "height dimension of the electronic component in the state where a film is to be formed" mentioned above means the dimension of the height of the electronic component in a state where the component is housed in the cavity. In other words, the "height dimension of the electronic component in the state where a film is to be formed" does not necessarily indicate the height of the electronic component in a state where the electronic component is implemented, and may be the length of the electronic component in a longer-side direction, may be the length (the width) thereof in a shorter-side direction, or may be the thickness thereof.

A film-forming groove communicating with the film-forming opening of the mask plate is provided in the inner side of the cavity. A film-forming material for forming the external structural body to be formed on the outer surface of the electronic component is firstly supplied onto the front surface (a surface facing the mask plate) of the chip through the film-forming opening of the mask plate. Then, the supplied film-forming material flows in the film-forming groove communicating the film-forming opening, thus being supplied also onto a peripheral surface (a surface abutting on the inner surface, in which the film-forming groove is formed, of the cavity) of the chip. Accordingly, the external structural body is formed, not only on the surface facing the mask plate, but also on the peripheral surface of the chip. The film-forming groove may be formed in a shape corresponding to the shape of the external structural body to be formed on the peripheral surface of the chip. With this structure, it is possible to form an external structural body with accurate dimensions and shape at an accurate position, in comparison with the above-described case where the flowing of the film-forming material is simply utilized.

"External structural body" described in the present invention represents a film-shaped structure formed on the outer surface of an electronic component. Typical examples of such an external structural body include electrodes and conductors, such as terminal electrodes and connection electrodes (including, for example, external connection electrodes, bump electrodes, post electrodes), wiring, connection pads (including flip-chip bonding pads, wire-bonding pads), and lands. However, the external structural bodies are not limited to these, and include other functional films such as insulating films. Various kinds of film-shaped structure (external structural bodies) are provided to the outer surface of the chip. For example, an insulating film is selectively provided thereon for forming wiring on the outer surface of a conductive chip formed of a semiconductor or a metal plate as described above. The external structural body in the present invention includes these structures. The point is that the present invention can be widely employed for structures each formed of a film-forming material supplied to the outer surface of an electronic component through a pattern mask.

Incidentally, one of the features of the present invention is that an external structural body can be formed at once on the upper and lower surfaces (or one of the upper and lower surfaces) of a chip, and also on a peripheral surface thereof. "At once" of this case does not only mean the complete temporal simultaneity. Specifically, while a film-forming material firstly reaches, and is then grown on, a surface, facing the mask plate, of the chip, a film on the peripheral surfaces is normally more slowly grown than a film on the upper and lower surfaces. "At once" described in the present invention also includes such a state. The point is that "at once" means that it is possible to form the external structural body on "all the surfaces together" in a single film-forming operation without taking out the electronic component from the masking apparatus, or without disassembling the masking apparatus.

Moreover, the "up and down direction" and the vertical direction mean a direction of the thickness of the mask plate or the mask base body (a direction perpendicular to the surface of the mask). The "horizontal direction" means a direction parallel to the surface of the mask.

In addition, the "electronic components" described in the present invention are not limited to any particular type. The "electronic components" include both discrete components, also known as chip components (for example, chip capacitors, chip inductors, chip resistors, chip thermistors, and chip varistors) and electronic devices each including plural electric elements (active elements and/or passive elements) combined with each other (for example, filters, duplexers, power amplifier modules, high-frequency superposition modules, isolators, sensors, actuators, connectors, and other various devices).

The position at which an external structural body is to be formed is also not particularly limited. An external structural body may be formed on any of the front surface, the back surface, and the peripheral surfaces (the side surfaces and the end surfaces) of the chip. In addition, the external structural body may be formed at any position on these surfaces. In addition, the external structural body may be formed at any position on these surfaces. Moreover, any number of external structural bodies having any shapes may be formed. The position, the shape, and the number, of the external structural body to be formed are not limited to examples illustrated in the drawings to be described later.

Furthermore, in embodiments to be described later, the following electrode structure is supposed to be formed. Specifically, a base electrode (for example, a Cr film, or a Cu film) is firstly formed by using a masking apparatus according to the present invention. Then, a main conductor layer (electrode main body) is formed on the base electrode by plating, so that a terminal electrode is formed. However, by using the masking apparatus according to the present invention, it is also possible to form: a surface layer (also referred to as a bonding layer, such as a Sn film, for enhancing the solder wettability) which is sometimes provided on a main conductor layer or on an electrode; an intermediate layer (for example, a Ni film) for enhancing the bondability of the surface layer and the main conductor layer formed of Cu or the like; or all the components of an electrode.

The above-described masking apparatus may further have the following characteristics. The mask base body includes two or more spacer plates including at least a first spacer plate and a second spacer plate each of which has a cavity-forming portion for forming the cavity, and which are stacked on each other in the thickness direction of the mask base body. The cavity is formed by the cavity-forming portions of these two or more spacer plates. At least one of these cavity-forming portions includes the film-forming groove. One of the first and second spacer plates serves as a reference spacer plate which is used as a reference at the time of horizontally positioning the electronic component in the cavity. The cavity-forming portion of the reference spacer plate includes a first reference inner surface and a second reference inner surface intersecting each other to form a reference corner portion, while the relative position of the reference spacer plate with respect to the mask plate is fixed. The other one of the first and second spacer plates serves as an offset spacer plate which is arranged to be slidable in the horizontal direction, and which presses, by using the cavity-forming portion thereof, the electronic component housed in the cavity to horizontally move the electronic component in the cavity. By moving the offset spacer plate in a direction from the center portion of the cavity toward the reference corner portion, the electronic component can be pressed against the reference corner portion formed by the first and second reference inner surfaces to be positioned with respect to the mask plate.

According to the apparatus with such a structure, a chip can be easily housed in a cavity by increasing the size of the opening of the cavity at the time of loading the chip, while the chip can be securely positioned with respect to the mask plate after the housing of the chip, so that a correct film-forming can be performed.

Specifically, the mask base body includes two or more spacer plates including at least a first spacer plate and a second spacer plate each of which has a cavity-forming portion for forming the cavity, and which are stacked on each other in the thickness direction of the mask base body. One (for example, the first spacer plate) of the first and second spacer plates is configured to function as a reference spacer, and the relative position of the first spacer place is fixed with respect to the mask plate provided with the film-forming opening. The structure for fixing the first spacer place is not particularly limited. For example, it is possible to restrict the relative movement of the first spacer plate by providing plural (at least two) bolts or rod-like members (for example, positioning pins) each penetrating the mask plate and the first spacer plate.

Each spacer plate is provided with the cavity-forming portion for forming the cavity. Among these spacer plates, the reference spacer (for example, the first spacer plate) has a first reference inner surface and a second reference inner surface which intersect with each other to form a reference corner portion. The reference corner portion, which is defined by these inner surfaces, functions as a positional reference to the mask plate (the film-forming opening). The chip is pressed against the reference corner portion by using an offset spacer plate (to be described later) so as to be correctly positioned with respect to the film-forming opening.

On the other hand, the other one (for example, the second spacer plate) of the first and second spacer plates is configured to function as the offset spacer plate. The offset spacer plate is placed to overlap the mask plate and the reference spacer plate so as to be slidable relative to these two plates. The cavity formed by the cavity-forming portions of the respective spacer plates is larger in size than the horizontal cross section of the chip in a state where the chip is to be received (that is, a state where the offset spacer is not horizontally moved yet, and where the chip is not positioned yet. The position of the offset spacer in this state is hereinafter referred to as a "first horizontal position"). Accordingly, the chip can be easily housed in the cavity.

It should be noted that the above-described "horizontal cross section of the chip" is a horizontal cross section of the chip (electronic component) in a state (attitude) of the chip to be housed in (inserted into) the cavity. In other words, the horizontal cross section of the chip is a cross section of the chip parallel to the chip's surface (the upper surface or the lower surface) which faces the mask plate when the chip is housed in the cavity. Accordingly, the horizontal cross section corresponds to a surface, facing the mask plate, of the chip, and may thus be a cross section parallel to, for example, the top surface (the front surface), the bottom surface (the back surface), each of the side faces, or each of the end surfaces. In the present invention, the cavity-forming portions are arranged in accordance with the size of the horizontal cross section. Specifically, the cavity-forming portions are arranged so that the opening size of the cavity at the first horizontal position before the moving operation of the chip (before the positioning operation of the chip using the offset spacer plate) can be larger than the horizontal cross section.

As the upper limit of the size of the cavity before the moving operation, the opening size of the cavity before the moving operation is desirably set as follows. Specifically, it is desirable that the opening size before the moving operation be set at a size which does not allow the chip to rotate in the horizontal direction (about an axis parallel to the depth direction of the cavity) in a state where the chip is inserted into the opening. The upper limit is set for the purpose of preventing the chip to unintentionally rotate, and thus to be displaced when the chip is moved inside the cavity by using the offset spacer plate.

After the chip is housed in the opening formed by these cavity-forming portions, the offset spacer plate is moved in a direction from the center portion of the cavity toward the reference corner portion of the reference spacer plate. The chip in the cavity is thus pressed by the cavity-forming portion of the offset spacer plate to be horizontally moved toward the reference corner portion of the reference spacer plate. The chip is eventually pressed against the reference corner portion to be correctly positioned with respect to the mask plate (the film-forming opening). Note that, the position of the offset space in this state is hereinafter referred to as a "second horizontal position."

The number of spacer plates forming the mask base body is not limited to two, and may be three or more (a spacer plate may be provided in addition to the first and second spacer plates). In this case, the spacer plate provided in addition to the first and second spacer plates may be configured to function as a reference spacer or an offset spacer (to be described later) in the same manner as those of the first and second spacer plates. Alternatively, the spacer plate may be configured to function as one different from the reference spacer and the offset spacer while including a cavity-forming portion (for example, a spacer plate stacked simply so that the dimension of the depth of the cavity can be set equal to the height dimension of the electronic component in a state where a film is to be formed, such as intermediate spacers 15 and 16 in FIG. 2 to be described later). Note that, when two or more reference spacers and/or two or more offset spacers are provided, the stacking order of these spacers is not particularly limited. The reference spacer and the offset spacer may be alternately stacked, or the reference spacers or the offset spacers may be successively stacked.

The film-forming groove formed in the inner surface of the cavity may have a depth corresponding to the length of the external structural body to be formed on the peripheral surface of the electronic component in the state where the film is to be formed. With this configuration, when an external structural body having a certain length (a length extending not across the total length of a peripheral surface of a chip, but to a middle portion thereof) is formed on the peripheral surface of the chip, the external structural body with an accurate length dimension can be formed.

On the other hand, in the present invention, the mask plate may be disposed on each of the upper and lower surfaces of the mask plate body, while the film-forming groove may communicate with each of the film-forming openings of the respective mask plates arranged on the upper and lower surfaces of the mask base body, to penetrate the mask base body. With the mask (the film-forming groove) of such a structure, it is possible to form an external structural body extending across the total height (the total length in the vertical direction) of a peripheral surface of a chip (for example, an electrode which connects, with each other, electrodes on the upper and lower surfaces of the chip in a state where the chip is housed).

In addition, the present invention may have the following configuration. Specifically, each of the first and second spacer plates includes a plate-shaped spacer main body portion and a through opening. The spacer main body portions are stacked on each other in the thickness direction of the mask base body while the through openings penetrate the respective spacer main body portions. Moreover, the cavity-forming portions are arranged to protrude into a forming region of the through openings to form the cavity in the through openings. In such a masking apparatus, the cavity in which a chip is housed is formed in the through holes of the first and second spacer plates.

Moreover, in such masking apparatus, it is preferable that each of the first and second spacer plates include two or more aforementioned cavity-forming portions, and that these two or more cavity-forming portions are arranged to protrude into the forming region of the same through opening, so that two or more aforementioned cavities are formed in the through opening.

When the cavity-forming portions are provided so that a plurality of the cavities can be formed in a single through opening, the cavities, which are adjacent to each other, and which are formed in the same through opening, can be arranged close to each other. Accordingly, it is possible to arrange more cavities in the masking apparatus overall than a case where only one cavity is formed in one through opening. As a result, the total number of chips to be processed at once can be increased.

Moreover, in the mask structure in which a cavity-forming portion is provided in a through opening, it is preferable that the side surfaces of the cavity-forming portions, protruding in the forming region of the through openings to abut on the corresponding peripheral surfaces of the electronic component housed in the cavity, of the first and second spacer plates, have substantially the same height dimension, and are also arranged at substantially the same height position.

As described before, one of the first and second spacer plates serves as the reference spacer plate, while the other one serves as the offset spacer plate for moving a chip. When the cavity-forming portions of these spacer plates have the same height as described above, the peripheral surfaces of the chip are held by these cavity-forming portions at the same height position. Accordingly, the provision of at least a pair of one reference spacer plate and one offset spacer plate makes it possible to stably move and hold a chip in the cavity without tilting the chip in the cavity, at the time of moving the chip in the cavity (at the positioning operation), and at the time of the film-forming process after the moving the chip.

On the other hand, when a chip is moved by using the offset spacer plate, and particularly when a thin chip is moved, it is possibly difficult to accurately position the chip because the chip is slid into, or stuck in, a gap between the spacer plates, or because the offset spacer plate goes on the chip. In this respect, in the masking apparatus according to the present invention, each of the mask and spacer plates may be made of any one of a magnet plate and a magnetic body plate. Here, the magnet plate includes a magnet in at least a part thereof, while the magnetic body plate includes, in at least a part thereof, a magnetic body which can be attracted by the magnet. With this configuration, it is possible to firmly bring these plates constituting the masking apparatus into contact with each other so as to unit these plates as a whole. Accordingly, the buckling and undulating of each plate can be more securely prevented. As a result, the sliding-in or the displacement of the chip can be prevented.

It is preferable that the entire magnet plate, constituting the mask plate or the spacer plate, be a magnet (that is, the entire magnet plate is made of a magnet, or the entire plate is magnetized to be a magnet) in terms of more securely preventing the buckling and the undulating of each plate. However, the magnet plate is not necessarily limited to such a configuration, and may be one having a magnet in a part thereof. For providing the magnet plate with a magnet in a part thereof, a magnet may be buried in, or attached to, the plate, and alternatively a part of the plate may be magnetized.

In the same manner, it is preferable that the entire magnetic body plate, constituting the mask plate or the spacer plate, be a magnetic body (that is, the entire plate, or at least the entire front and back surfaces thereof be made of a magnetic body in terms of more securely preventing the buckling and the undulating of each plate. However, the magnetic body plate is not necessarily limited to such a configuration, and may be one having a magnetic body in a part thereof. It should be noted that, suppose a case where the mask plate or the spacer plate has a magnet or a magnetic body in a part thereof. In this case, when the position, in the horizontal direction, of the magnet or the magnetic body (the position when viewed in a plane) in the mask or spacer plate is substantially the same for these mask and spacer plates, it is possible to attract the magnetic body by the magnet so that the plates can be brought into close contact with each other (the same may be applied to a manufacturing method to be described later).

Moreover, each of the mask and spacer plates may be configured of any one of a magnet plate and a magnetic body plate so that the magnetic body plate and the magnet plate can be alternately stacked on each other. With this configuration, it is possible to further enhance the adhesion among these plates.

In addition, the masking apparatus may further include a film which covers the entire magnet plate or the magnet included in the magnet plate. The provision of such a film makes it possible to avoid the magnet from being cracked due to the repetitive use of these plates of the masking apparatus, and to thus avoid a problem that a fragment of the magnet is mixed to a product (an electronic component), and the like.

It is preferable that the film is made of a metallic film formed of a magnetic material, such as nickel (Ni) and chrome (Cr), in terms of bringing the corresponding two of the mask plate and spacer plates in close contact with each other by a magnetic force. However, the material of the film is not limited to these magnetic materials, and may be a film formed of another metallic material, or a material other than metals.

The magnetic body may be made of a material, such as SUS430, including iron as the main component.

On the other hand, the magnet preferably is a permanent magnet formed of a material including iron as the main component, but may be an electromagnet. Moreover, the permanent magnet may be one including at least one of samarium, cobalt, and neodymium, or may be formed by magnetizing a plate made of SUS430.

A method of fabricating an electronic component according to the present invention includes the steps of: housing an electronic component in a cavity, in which the electronic component can be housed, of a mask base body including at least one spacer plate; disposing a mask plate on one of, or each of, an upper surface and a lower surface of the mask base body, the mask plate including a film-forming opening with a shape corresponding to the shape of an external structural body to be formed on an outer surface of the electronic component; and forming the external structural body by selectively performing a film-forming operation on the outer surface of the electronic component through the film-forming opening.

Moreover, in the method, the cavity has a depth dimension substantially equal to the height dimension of the electronic component in a state where the film is to be formed, so as to surround the periphery of the electronic component housed therein. The cavity also includes, in an inner surface thereof, a film-forming groove communicating with the film-forming opening. In addition, in the forming step, a material for forming the external structural body is supplied into the cavity through the film-forming opening. Accordingly, the external structural body is formed at once both on at least one of an upper and a lower surfaces of, and on a peripheral surface of, the electronic component.

According to such a method of fabricating an electronic component, it is possible to fabricate an external structural body, such as an electrode, on an outer surface of an electronic component with fewer processes than a conventional method.

In addition, the fabricating method may further include, between the housing step and the forming step, a step of positioning the electronic component housed in the cavity with respect to the mask plate by horizontally moving the electronic component in the cavity.

In this configuration, the mask base body includes two or more spacer plates including at least a first spacer plate and a second spacer plate. Each of the first and second spacer plates has a cavity-forming portion for forming the cavity, and the first and second spacer plates are stacked on each other in the thickness direction of the mask base body. The cavity is formed by the cavity-forming portions of these two or more spacer plates, while at least one of these cavity-forming portions includes the film-forming groove. One of the first and second spacer plates serves as a reference spacer plate which is used as a reference at the time of horizontally positioning the electronic component in the cavity. The cavity-forming portion of the reference spacer plate includes a first reference inner surface and a second reference inner surface intersecting each other to form a reference corner portion. The relative position of the reference spacer plate with respect to the mask plate is fixed. The other one of the first and second spacer plates serves as an offset spacer plate which is arranged to be slidable in the horizontal direction, and which presses, by using the cavity-forming portion thereof, the electronic component housed in the cavity so as to horizontally move the electronic component in the cavity. In the positioning step, the offset spacer plate is moved in a direction from the center portion of the cavity toward the reference corner portion. Accordingly, the electronic component is pressed against the reference corner portion, formed by the first and second reference inner surfaces, so as to be positioned with respect to the mask plate.

According to this method, as in the case of the masking apparatus of the present invention, it is possible to easily house a chip in the cavity, and to accurately position the chip housed therein with respect to the mask plate.

In addition, in the method as well, each of the mask and spacer plates may be formed of any one of a magnet plate and a magnetic body plate. Here, the magnet plate includes a magnet in at least a part thereof, while the magnetic body plate includes, in at least a part thereof, a magnetic body which can be attracted by the magnet.

In the forming step, the film-forming operation is performed on the outer surface of the electronic component by means of any one of: a vapor deposition method (a dry deposition method), such as a sputtering method, an evaporation method, and a vapor growth method (a CVD method); an ink jet method; a paste printing method; and a transfer method. By any one of these method, the external structural body is formed on the outer surface of the electronic component.

Furthermore, an electronic component of the present invention provides the following characteristics. The electronic component of the present invention includes an electronic component main body and an external structural body. The electronic component main body includes at least one element portion with an electrical function, and also has at least two outer surfaces which are adjacent to each other, and which intersect each other. The external structural body is provided in a manner of being continuous on at least two of the outer surfaces of the electronic component main body. In the electronic component, the external structural body does not include an interface in a corner portion where the adjacent outer surfaces thereof intersect each other.

As described above, when an external structural body (for example, an electrode) is formed continuously on a plurality of outer surfaces intersecting one another, it has been conventionally necessary that a film-forming operation is performed separately on each of the surfaces. However, in such an external structural body, an interface is formed in a corner portion of the intersecting surfaces (a boundary between a film portion, formed on the first surface, of the external structural body, and a film portion, formed on the second surface, of the external structural body). The existence of such an interface increases an electric resistance as have been already described. In addition, an external force and an internal stress are likely to be exerted on such a corner portion more than a planar surface portion. Accordingly, the existence of the interface is not preferable also in terms of the mechanical bonding strength of the external structural body.

For this reason, in the electronic component of the present invention, the external structural body does not include an interface in a corner portion, where the adjacent outer surfaces intersect, of the electronic component main body. This structure enhances the electric characteristics and the mechanical bonding strength of the external structural body. It should be noted that such an external structural body having no interface over a plurality of outer surfaces can be fabricated by the fabricating method of, or by using the masking apparatus of, the present invention.

In addition, "having no interface" described here means that the external structural body does not have any interface, not in the thickness direction of the external structural body, but in the length direction thereof. For example, when the external structural body has a structure in which a plurality of film-formation layers, an interface may exist among the plurality of film-formation layers (in the thickness direction of the external structural body). Moreover, the electronic component described in the present invention includes, that is, the present invention also includes an electronic component having an interface not in a corner portion of the electronic component main body, but for example in a middle portion of an outer surface of the electronic component main body. For example, when a sputtering is performed not on two surfaces at once, but on two surfaces separately in two processes as in an embodiment to be described later, an interface is formed in a peripheral surface of a chip. Such a chip is also included in the present invention as long as an interface does not exist in a corner portion (a boundary portion of two adjacent outer peripheral surfaces) of the electronic component main body.

Moreover, the "element portion with an electrical function" is a portion exhibiting somewhat an electrical (or an electromagnetic) function, and means a portion constituting a function of a passive element, for example, an inductor, a capacitor, a resistor, or means a portion constituting a function of an active element, for example, a transistor. The electronic component of the present invention includes at least one element portion which achieves any of these electrical functions.

According to the present invention, it is possible to the number of processes of fabricating an external structural body to be provided on an outer surface of an electronic component by forming the structural body on a plurality of surfaces at once. In addition, it is possible to achieve a favorable mechanical and electrical bonding condition for the external structural body. Moreover, it is also possible to easily house an electronic component in a cavity of a masking apparatus, and to securely position the electronic component. As a result, an electrode with a more accurate shape can be formed at a more accurate position.

Other objects and features of the present invention will become apparent from the following detailed description considered in connection with the accompanying drawings. It is to be understood, however, that the drawings are designed as an illustration only and not as a definition of the limits of the invention. In the drawings, similar reference characters denote similar elements throughout the several views.

DESCRIPTION OF THE EMBODIMENTS

First Embodiment

Figure 1:
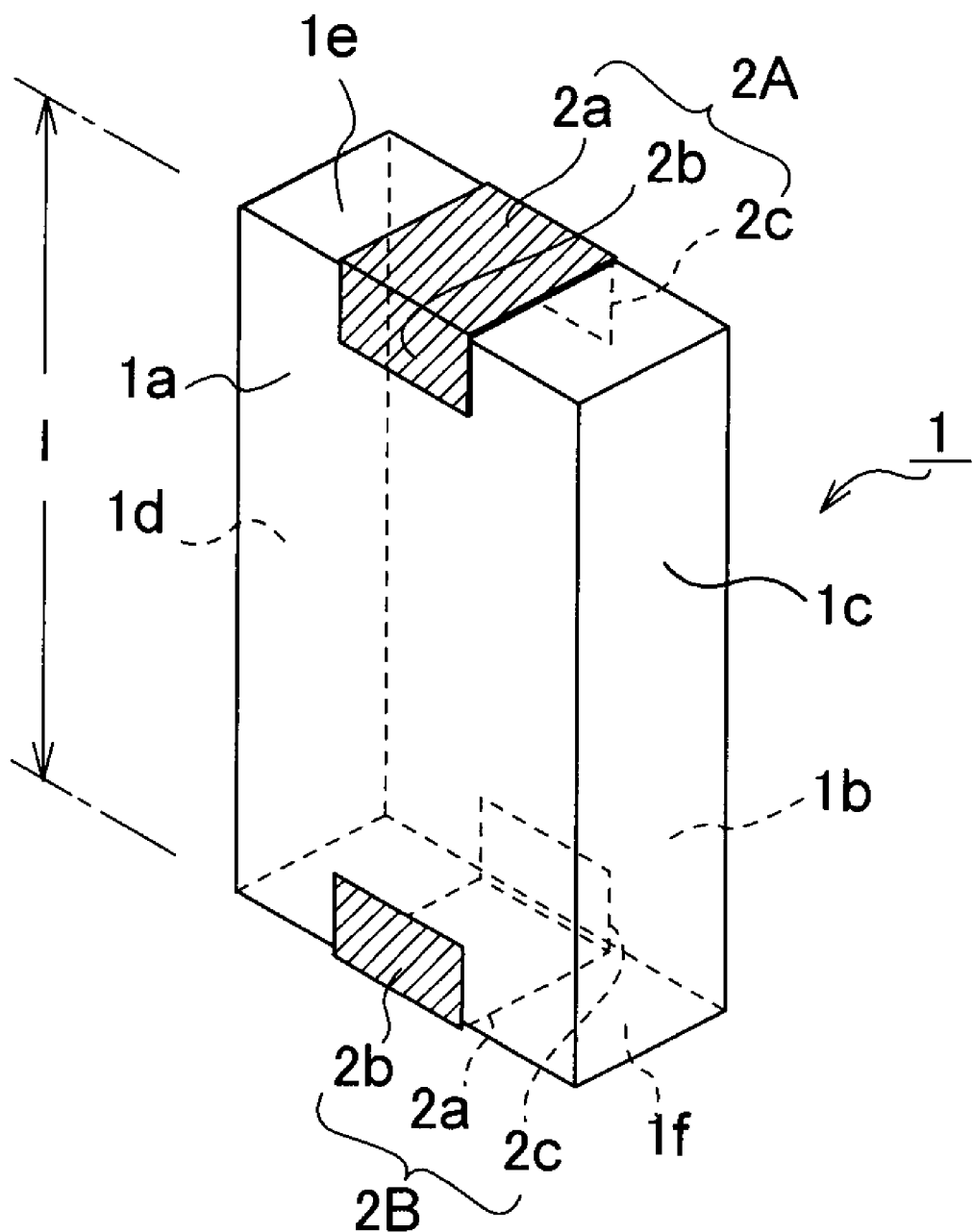
FIG. 1 is a perspective view showing a chip (an electronic component), on which terminal electrodes are formed by using a masking apparatus according to a first embodiment of the present invention.

FIG. 1 shows an electronic component (a chip) on which terminal electrodes are formed by using a masking apparatus according to a first embodiment of the present invention. As shown in FIG. 1, the masking apparatus according to the first embodiment is capable of forming terminal electrodes 2A and 2B respectively on the two end portions of a chip 1 by a sputtering process at once (in a single film-forming process). By using the masking apparatus according to the first embodiment, each of the terminal electrodes 2A and 2B can be continuously formed on a top surface 1a, on a corresponding one of end surfaces (a pair of side surfaces in a shorter-side direction) 1e and 1f, and on a bottom surface 1b, of the chip 1.

Figure 2:
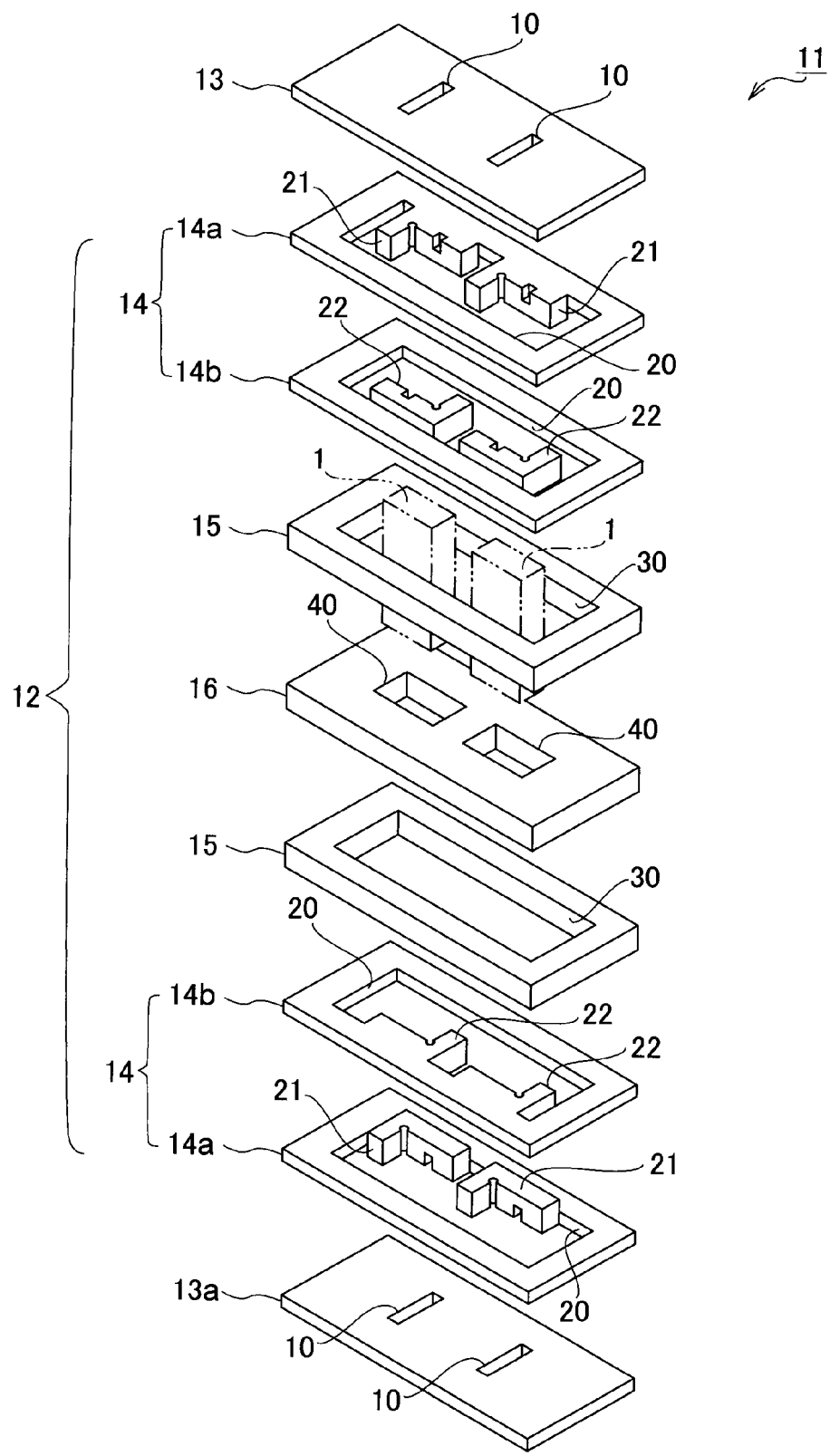
FIG. 2 is an exploded perspective view conceptually showing a part (a part including one through opening/the same is applied to the following drawings) of the masking apparatus according to the first embodiment.
Figure 3:
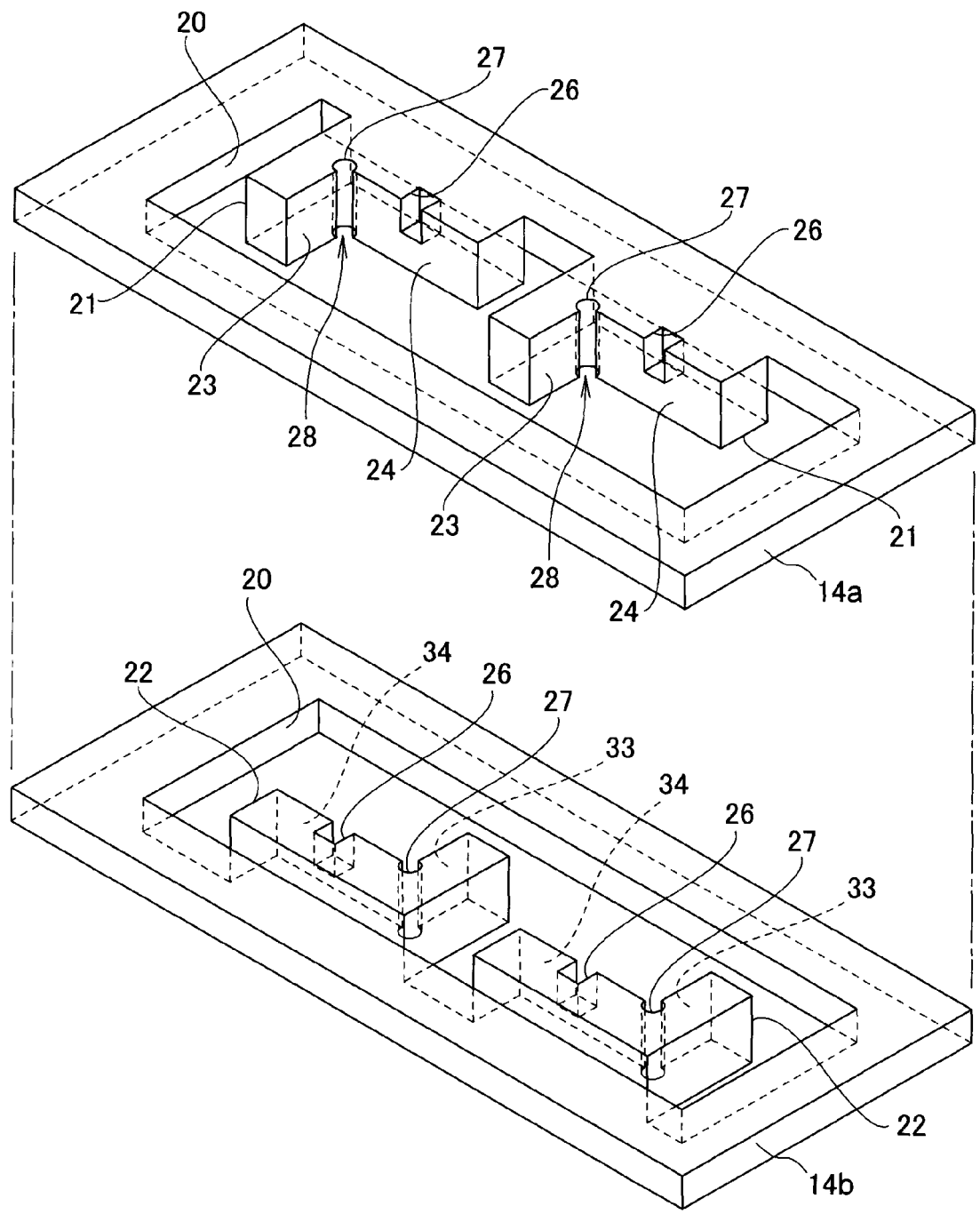
FIG. 3 is a perspective view showing, in an enlarged manner, reference spacers and offset spacers, included in the masking apparatus according to the first embodiment.
Figure 4A:
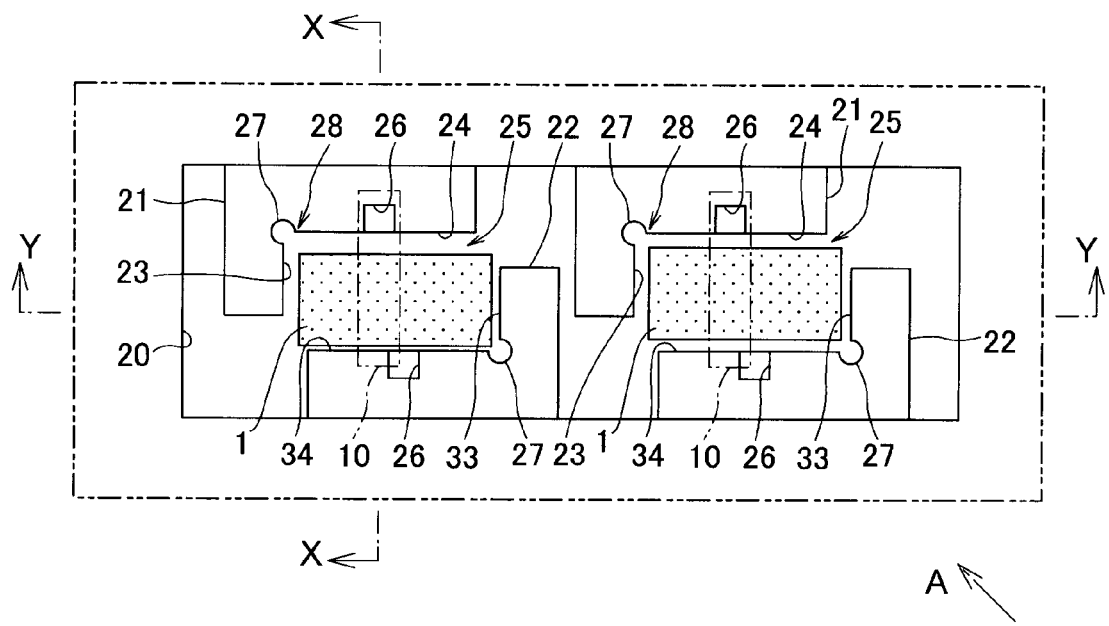
FIG. 4A is a plan view conceptually showing the masking apparatus (in a state where chips are loaded in cavities) according to the first embodiment.
Figure 4B:
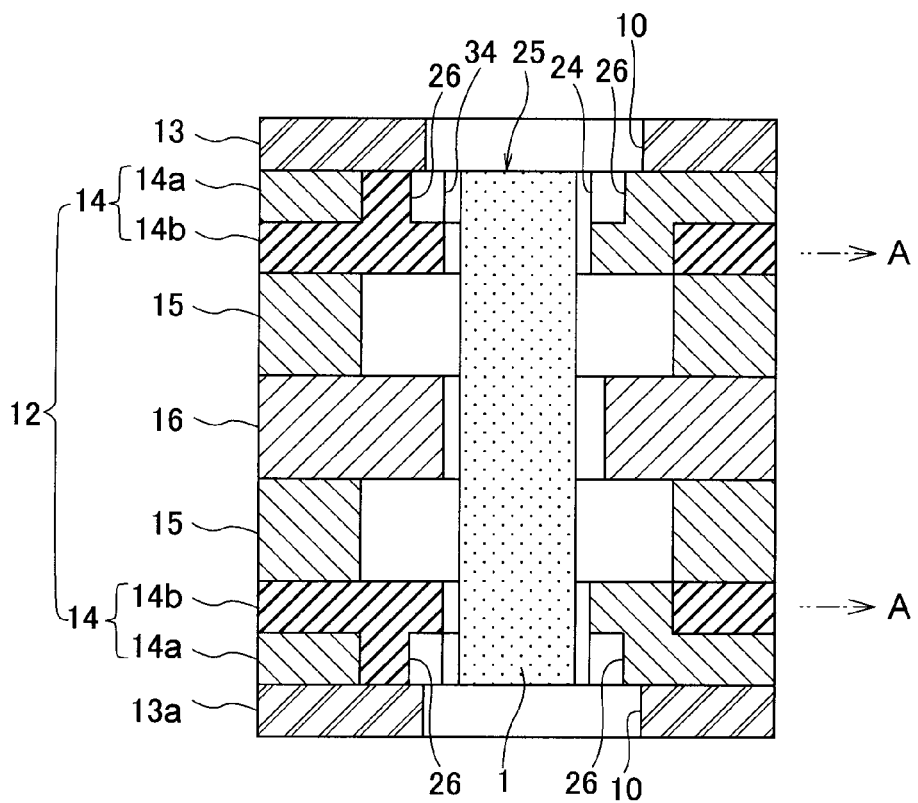
FIG. 4B is a cross-sectional view taken along the line X-X in FIG. 4A.
Figure 4C:
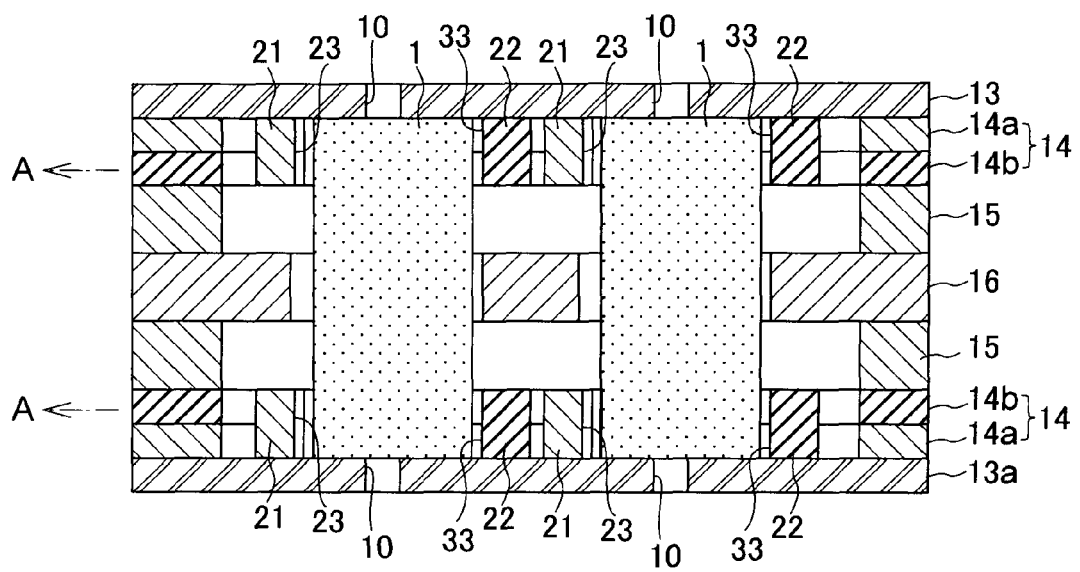
FIG. 4C is a cross-sectional view taken along the line Y-Y in FIG. 4A.
Figure 5A:
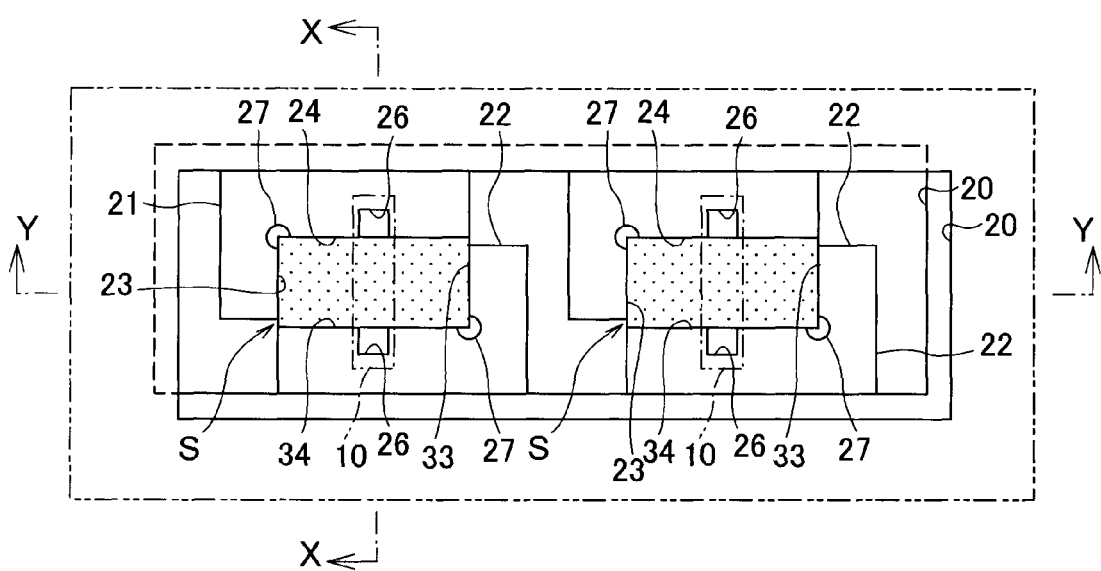
FIG. 5A is a plan view conceptually showing the masking apparatus (in a state where films are formed) according to the first embodiment.
Figure 5B:
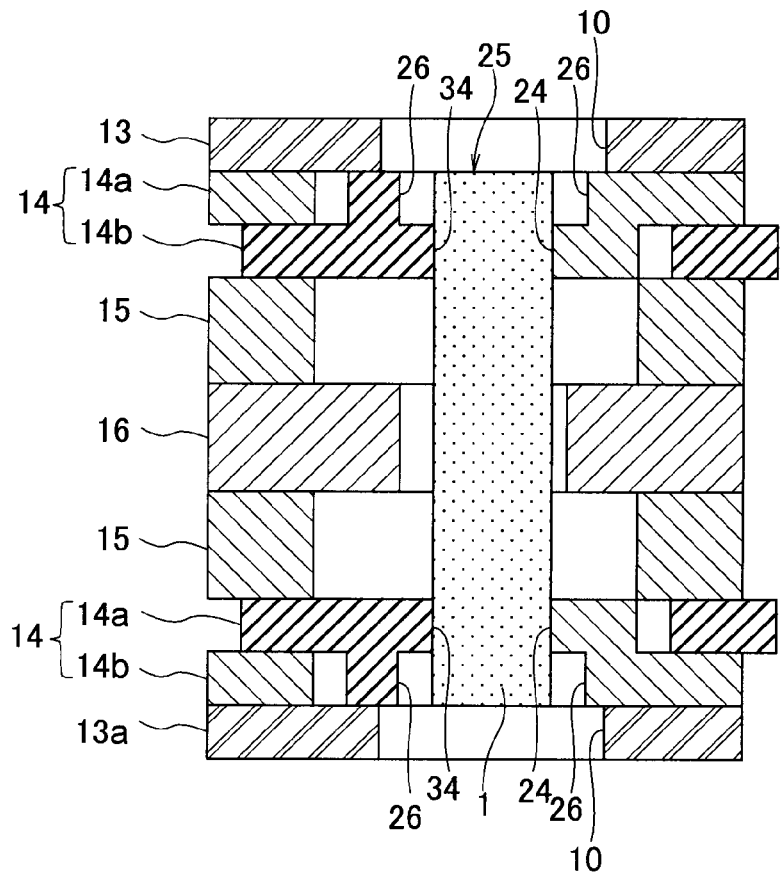
FIG. 5B is a cross-sectional view taken along the line X-X in FIG. 5A.
Figure 5C:
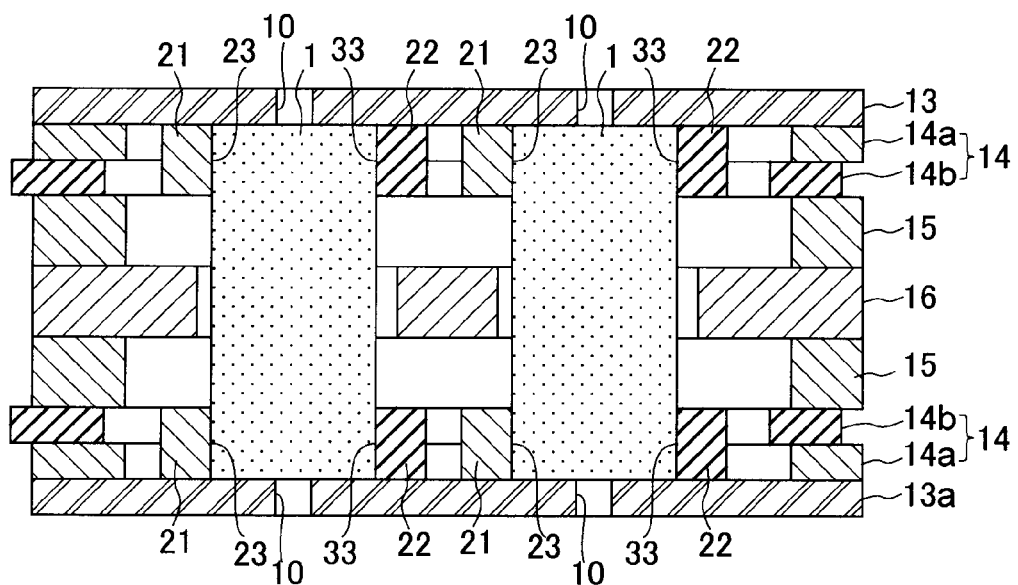
FIG. 5C is a cross-sectional view taken along the line Y-Y in FIG. 5A.
Figure 6A:
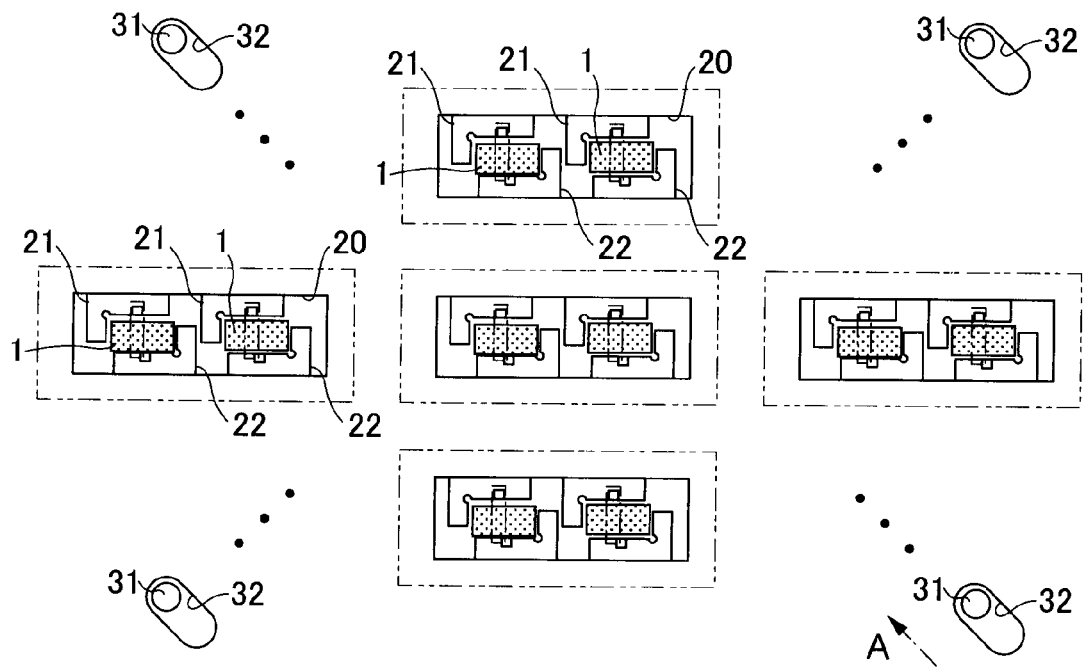
FIG. 6A is a plan view showing the masking apparatus (in the state where the chips are loaded in the cavities) according to the first embodiment.
Figure 6B:
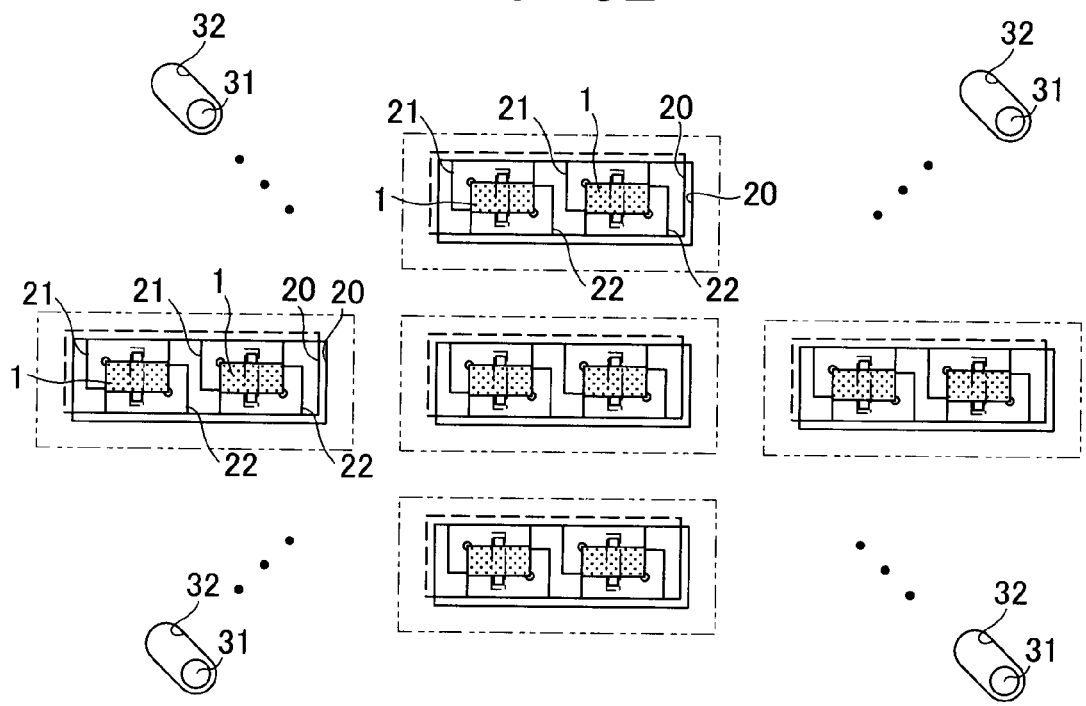
FIG. 6B is a plan view showing the masking apparatus (in the state where the films are formed) according to the first embodiment.

FIG. 2 is an exploded perspective view conceptually showing the masking apparatus according to this embodiment. FIG. 3 is a perspective view showing, in an enlarged manner, a reference spacer and an offset spacer both included in the masking apparatus. Each of FIGS. 4A to 4C shows a state where a chip is loaded in the masking apparatus. FIG. 4A is a plan view. FIG. 4B is a cross-sectional view taken along the line X-X in FIG. 4A while FIG. 4C is a cross-sectional view taken along the line Y-Y in FIG. 4A. Each of FIGS. 5A to 5C shows a state where films are formed by the masking apparatus. FIG. 5A is a plan view. FIG. 5B is a cross-sectional view taken along the line X-X in FIG. 5A, while FIG. 5C is a cross-sectional view taken along the line Y-Y in FIG. 5A. Each of FIGS. 6A and 6B is a conceptual view for explaining the overall configuration of the masking apparatus.

As shown in these figures, the masking apparatus 11 according to the first embodiment includes a mask base body 12, and pattern masks (mask plates) 13 and 13a. The chip 1 is housed in, and held by, the mask base body 12. The pattern masks 13 and 13a are disposed respectively on front and back surfaces of the mask base body 12. Note that, unillustrated reinforcement plates for supporting these pattern masks 13 and 13a are provided respectively on the surfaces of the pattern masks 13 and 13a (the upper surface of the upper-side pattern mask 13 and the lower surface of the lower-side pattern mask 13a).

In addition, each of FIGS. 2, 3, 4A to 4C, and 5A to 5C conceptually shows a part (a housing part for two chips, that is, a part including two cavities) of this masking apparatus (the pattern masks 13 and 13a, the mask base body 12, and the like) in an enlarged manner (a second embodiment, which is to be described later, is also shown in FIGS. 8, 9, 10A to 10C, 11A to 11C, and 12 in the same manner). In the system 11 of this embodiment, a large number (several hundreds to several thousands) of cavities 25 are formed in the mask base body 12 so that a large number of chips 1 can be housed in the cavities 25, respectively. Moreover, a large number of film-forming openings 10 are formed in the pattern masks 13 and 13a to correspond to the cavities 25, respectively. This makes it possible to perform a film-forming process on the large number of chips 1 at once.

The openings 10 formed in the pattern masks 13 and 13a have shapes corresponding to the shapes of the electrodes 2A and 2B, which are to be formed. Specifically, each opening (film-forming opening) 10 is formed to correspond to a film-forming groove 26 used for forming an electrode-formed portion 2a on the upper surface (a corresponding one of the end surfaces 1e and 1f) of the chip 1 housed in the cavity 25, as well as electrode portions 2b and 2c on the respective peripheral surfaces (the top surface 1a and the bottom surface 1b) of the chip 1. The electrode films 2A and 2B are formed by sputtering through the film-forming openings 10. Note that, the film-forming method is not limited to a sputtering method, but may be another vapor deposition method (for example, an evaporation method and a CVD (chemical vapor deposition) method), an ink jet method, a paste printing method, or a transfer method, as already described. In addition, openings are formed also in the aforementioned unillustrated reinforcement plates, so that the film-forming openings 10 are not blocked.

The mask base body 12 is formed of a plurality of reference spacers 14a (two in this embodiment), a plurality of offset spacers 14b (two in this embodiment), and a plurality of middle spacers 15 and 16 (three in this embodiment). The periphery (the two side surfaces 1d and 1c, the bottom surface 1b, as well as the top surface 1a) of the chip 1 is thus surrounded by these spacers 14a, 14b, 15 and 16. In addition, the height of the stack of the spacers 14a, 14b, 15 and 16 (the height of the mask base body 12) is equivalent to the height 1 (see FIG. 1) of the chip 1 in the longer-side direction thereof. The chip 1 is firstly housed in the cavity 25 in an upright state. When the upper-side pattern mask 13 is placed on the top of the chip 1, the chip 1 is held by the upper-side and lower-side pattern masks 13 and 13a to be fixed in between in the vertical direction.

In this embodiment, one reference spacer 14a and one offset spacer 14b are paired (hereinafter, such a pair of the reference spacer 14a and the offset spacer 14b is referred to as a "positioning spacer pair," or simply as a "spacer pair"). Two positioning spacer pairs 14 are arranged respectively in the upper end portion and the lower end portion of the mask base body 12, so that the chip is positioned with respect to the pattern masks 13 and 13a by the two spacer pairs 14. The reference spacer 14a and the offset spacer 14b, which form each spacer pair 14, are stacked adjacent to each other in the up and down direction.

Note that, although each spacer pair 14 is formed of the single reference spacer 14a and the single offset spacer 14b in this embodiment, the number of reference spacers 14a and the number of offset spacers 14b are not particularly limited. There may be two or more reference spacers 14a in each spacer pair 14, while there may be two or more offset spacers 14b in each spacer pair 14. Moreover, one spacer pair 14, or more than two spacer pairs 14 may be provided.

The reference spacers 14a are disposed in a manner that the relative positions of the reference spacers 14a in the horizontal direction are fixed between the pattern masks 13 and 13a by use of positioning pins 31 (see FIGS. 6A and 6B) each penetrating the masking apparatus 11. In addition, each of the reference spacers 14a and the offset spacers 14b is provided with a through opening 20 penetrating the corresponding spacer 14a or 14b. Cavity-forming portions 21 and 22 for forming the cavities 25 are formed inside the corresponding through openings 20. Each of the cavity-forming portions 21 and 22 has two inside surfaces perpendicular to each other to have a substantially L shape in the plane, and horizontally protrudes into the through opening 20 from one side edge of the corresponding through opening 20.

Meanwhile, the offset spacers 14b, each stacked adjacent to the corresponding one of the reference spacers 14a, are disposed in the following manner as shown in FIGS. 6A and 6B, for example. Specifically, the offset spacers 14b are engaged with the positioning pins 31 with long holes 32. This structure makes it possible to move the offset spacers 14b in the horizontal direction even in a state where the spacers 14a, 14b, 15 and 16 are stacked with the positioning pins 31 penetrating through the mask base body 12 (in a state where the pattern masks 13 and 13a as well as the reference spacers 14a are relatively fixed to one another in the horizontal direction).

The moving direction of the offset spacers 14b will be more specifically described. The offset spacers 14b can be moved in a direction (a diagonal direction of the cavity 25) in which a corner portion, which will be described later, formed by the two inside surfaces of the cavity-forming portion 22 of each offset spacer 14b is moved closer to a reference corner portion 28 of the corresponding spacer 14a. In other words, the offset spacers 14b are provided to be movable in the following manner. The cavity-forming portion 21 of each reference spacer 14a has the two (first and second) inside surfaces 23 and 24, while the cavity-forming portion 22 of each offset spacer 14b has the two (first and second) inside surfaces 33 and 34. By moving the offset spacers 14b, each first inside surface 23 comes closer to the corresponding first inside surface 33 that faces the first inside surface 23, while each second inside surface 24 comes closer to the corresponding second inside surface 34 that faces the second inside surface 24.

Each offset spacer 14b also includes the same through opening 20 as that of each reference spacer 14a, and also includes the cavity-forming portion 22 for forming the cavity 25 inside the through opening 20. Note that, the cavity-forming portion 22 of each offset spacer 14b horizontally protrudes into the through opening 20 from the side edge opposite to that from which the cavity-forming portion 21 of a corresponding one of the above-described reference spacers 14a protrudes. Each cavity-forming portion 22 thus has a reversed L shape in the plane, and is paired with the cavity-forming portion 21 of the corresponding reference spacer 14a so as to form the cavity 25 having a substantially rectangular horizontal cross-sectional shape. In other words, each cavity 25, in which the chip 1 is housed, is formed inside the through opening 20 with the pair of the cavity-forming portions 21 and 22 (the cavity-forming portion 21 supported by each reference spacer 14a and the cavity-forming portion 22 supported by the corresponding offset spacer 14b), which protrude into the through opening 20 to face each other.

In each through opening 20 in this embodiment, two pairs of cavity-forming portions 21 and 22 are provided to form two cavities 25. However, the number of cavities 25 (the number of pairs of cavity-forming portions 21 and 22) to be formed may be one (a single pair) for each through opening, or may be three or more by providing three or more pairs of cavity-forming portions 21 and 22, instead of two. Note that, in such cases, the size of each through opening 20 may be appropriately changed in accordance with the number of cavities 25 to be formed (a second embodiment to be described later may be also modified in the same manner).

The cavity-forming portion 21 of each reference spacer 14a and the cavity-forming portion 22 of each offset spacer 14b have the same thickness (height) dimension. In addition, the cavity-forming portion 21 of each reference spacer 14a arranged on the upper surface side has the upper surface flush with the upper surface of the corresponding reference spacer 14a. Accordingly, the upper surface of each reference spacer 14a is flat on the whole. The reference spacer 14a however protrudes downward inside the through opening 20, so that the lower surface of the protruding portion is thus flush with the lower surface of the offset spacer 14b arranged on the lower surface of the reference spacer 14a.

Meanwhile, the cavity-forming portion 22 of each offset spacer 14b arranged on the lower surface side has the lower surface flush with the lower surface of the corresponding offset spacer 14b (accordingly, the lower surface of the offset spacer 14b is flat on the whole). The offset spacer 14b however protrudes upward inside the through opening 20, so that the upper surface of the protruding portion is thus flush with the upper surface of the reference spacer 14a arranged on the upper surface of the offset spacer 14b. Accordingly, the cavity-forming portions 21 and 22 of the reference and offset spacers 14a and 14b included in the spacer pair 14 are arranged at the same height position. As a result, when the chip 1 is horizontally moved inside the cavity 25 to be retained therein as described above, the periphery of the chip 1 can be stably held with the cavity-forming portions 21 and 22 at the same height.

Note that, the above description is of the spacer pair 14 (in which the reference spacer 14a is arranged on the upper side while the offset spacer 14b is arranged on the lower side) arranged on the upper end side of the mask base body 12. By contrast, in the spacer pair 14 arranged on the lower end side of the mask base body 12, the offset spacer 14b is arranged on the upper side while the reference spacer 14a is arranged on the lower side. For this reason, the relation between the spacers 14a and 14b (the protruding directions of the respective cavity-forming portions 21 and 22 in the up and down direction) is reversed to the above description. It is however clear that the same function can be provided in this case as well as the aforementioned spacer pair on the upper end side.

The cavity-forming portion 21 of each reference spacer 14a has the L shape in the plane as described above to have the two inside surfaces 23 and 24 perpendicular to each other. These inside surfaces 23 and 24 serve as reference surfaces (a first reference inside surface and a second reference inside surface, respectively) for positioning the chip 1 (in the horizontal direction) with respect to the pattern masks 13 and 13a (the film-forming opening). The corner portion 28 formed by these reference surfaces 23 and 24 serves as a reference corner portion. The relative positions of these reference surfaces 23 and 24 as well as the reference corner portion 28 with respect to the film-forming opening 10 of the pattern masks 13 and 13a are fixed by use of the positioning pins 31. This makes it possible to position the chip 1 in the cavity 25 with respect to the pattern masks 13 and 13a.

It should be noted that a cylindrical notch groove 27 extending across the entire height of the cavity-forming portion 21 (extending from the upper surface to the lower surface) is formed in each reference corner portion 28. The provision of such a notch groove 27 makes it possible to place the corner of the chip 1 inside the notch groove 27 even in a case where the reference corner portion 28 is accidentally rounded (blunted) at the time of fabricating the spacer, in a case where the corner of the chip 1 has not been accurately formed at the time of positioning the chip 1, or in a case where an intruding object (dust) is attached to the corner of the chip 1. Accordingly, the peripheral surfaces of the chip 1 can be securely pressed against the first reference inside surface 23 and the second reference inside surface 24. As a result, the chip 1 can be accurately positioned with respect to the pattern masks 13 and 13a. In addition, the cavity-forming portion 22 of each offset spacer 14b is also provided with, for the same reason, a notch groove 27, which is the same as the notch groove 27, in the corner portion formed by the two inside surfaces 33 and 34.

Moreover, a space S is provided between the cavity-forming portion 21 of each reference spacer 14a and the cavity-forming portion 22 of the corresponding offset spacer 14b (see FIG. 5A). Accordingly, the cavity-forming portions 21 and 22 do not abut on each other even in a state where the chip 1 is positioned by moving the offset spacer 14b. The provision of the spacer S provides the following effect. Specifically, the positioning of the chip 1 is not obstructed by the cavity-forming portions 21 and 22 abutting on each other at the positioning operation of the chip 1, even in a case, for example, where an inaccuracy occurs in the forming of the cavity-forming portions 21 and 22, or where a variation occurs in the outer shapes of the chips 1. As a result, it is possible to securely press the chip 1 against the reference inside surfaces 23 and 24 of the reference spacer 14a, and to thus accurately position the chip 1 with respect to the pattern masks 13 and 13a.

A film-forming groove 26 is formed in each of the inside surface 24 and the inside surface 34 of the pair of cavity-forming portions 21 and 22 provided respectively to the reference spacer 14a and the offset spacer 14b in a manner where the film-forming grooves 26 of the respective inside surfaces 24 and 34 face each other. These film-forming grooves 26 are provided for allowing a sputtering material that has entered the masking apparatus through the film-forming openings 10 to further spread onto the peripheral surfaces (the top surface 1a side and the bottom surface 1b side) of the chip 1 housed in the cavity 25. Accordingly, the electrode films 2A and 2B each of which is continuous on the corresponding one of the end surfaces 1e and 1f are formed on the top surface 1a and the bottom surface 1b. The upper end (the lower end as to the spacer pair on the lower end side of the mask base body, which may be described in the same manner as the following description) of each film-forming groove 26 is opened to communicate with the film-forming opening 10 of the pattern mask 13. On the other hand, the film-forming grooves 26 also extend to middle portions of the corresponding cavity-forming portions 21 and 22 in the direction of the heights of the cavity-forming portions 21 and 22 (extends over the length corresponding to the length of the electrode portions 2b and 2c on the top surface 1a and the bottom surface 1b of the chip 1). The lower end (the upper end as to the spacer pair on the lower end side of the mask base body, which may be described in the same manner as the following description) of each film-forming groove 26 is blocked (that is, each film-forming groove 26 has a bottom.)

The middle spacers 15 and 16 are provided for filling the gap between the positioning spacer pair 14 in the upper end of the mask base body and the positioning spacer pair 14 in the lower end of the mask base body so as to surround the periphery of the chip 1. The middle spacers 15 and 16 are provided with through openings 30 and 40 that form the cavity 25 for housing the chip 1, together with the positioning spacer pairs 14 (the reference spacers 14a and the offset spacers 14b). Each of the through openings 30 and 40 may have any shape as long as the opening has a size large enough for allowing the loading and the positioning operation of the chip 1 to be performed without any difficulty. To be specific, any through opening of any shape may be employed as long as the opening satisfies the following conditions. The opening has to be larger in size than the cavity opening formed by the spacer pair 14 at the loading of the chip 1 (before the operation of moving the offset spacers 14b), and concurrently has to be arranged so as to include the cavity opening formed by the spacer pair 14 therein in the plan view. Alternatively, instead of any of, or all of the middle spacers 15 and 16, the aforementioned reference spacer 14a and the offset spacer 14b may be provided in the middle portion of the mask base body 12.

Loading and Positioning Operations of Chip

The chips 1 are loaded in the masking apparatus 1 in the following manner. Specifically, the chips 1 are inserted into the respective cavities 25 in a state where the unillustrated reinforcement plate on the lower surface, the pattern mask 13a, and the mask base body 12 (the reference spacers 14a, the offset spacers 14b, and the middle spacers 15 and 16) are stacked and assembled. Thereafter, the pattern mask 13 and the unillustrated reinforcement plate on the upper surface side are placed on the top. At this time, the offset spacers 14b are located at the above-defined first horizontal positions so that the cavity 25 is opened to a large extend as shown in FIGS. 4A to 4C, as well as 6A. Accordingly, the chips 1 can be easily inserted into the respective cavities 25.

After the chips 1 are loaded in the cavities 25, as shown in FIGS. 5A to 5C, as well as 6B, the offset spacers 14b are horizontally moved to the above-defined second horizontal positions so that the cavity-forming portions 22 of the offset spacers 14b can come closer to the cavity-forming portions 21 of the corresponding reference spacers 14a (see the arrows A in FIGS. 4A to 4C, and 6A). Each of the chips 1 is thus pressed by the inside surfaces 33 and 34 of the offset spacers 14 to be horizontally moved inside the corresponding cavity 25. Each of the chips 1 thus abuts on both of the reference surfaces 23 and 24 of the reference spacers 14a to tightly fit in the reference corner portions 28. In this state where the positioning of the chips 1 is completed, the chips 1 are sandwiched by the cavity-forming portions 21 of the reference spacers 14a and the cavity-forming portions 22 of the offset spacers 14b, so that the horizontal movement of each of the chips 1 is restricted. The chips 1 are thus fixed in the horizontal direction in the respective cavities 25 in a state where the chips 1 are positioned with respect to the film-forming openings 10 of the pattern masks 13 and 13a.

In addition, in this fixed state, the chips 1 are sandwiched by the positioning spacer pairs 14 (the cavity-forming portions 21 of the reference spacers 14a and the cavity-forming portions 22 of the offset spacers 14b) at the same height position. Concurrently, the positioning spacer pairs 14 are provided respectively in the upper and lower end portions of the chips 1. Accordingly, the chips 1 can be moved stably in the horizontal direction without being tilted, and thus can be held with respect to the pattern masks 13 and 13a on the respective upper and lower surface sides.

After the positioning of the chips 1 is completed, the pattern mask 13 and the reinforcement plate on the upper surface side are placed on the top. As a result, the chips 1 are sandwiched between the upper-side and lower-side pattern masks 13 and 13a, and are held in the respective cavities 25 also in the vertical direction.

Note that, the masking apparatus 11 is provided with a plurality of unillustrated through bolts with which the entirety of the masking apparatus 11 (the upper-side and lower-side pattern masks 13 and 13, as well as the mask base body formed of the spacers 14 to 16) can be fastened. The through bolts are provided due to the following reason. The chips 1 are firstly loaded in the respective cavities 25, and then the pattern mask 13 and the reinforcement plate on the upper surface side are placed on the top, as described above. After that, the entirety of the masking apparatus 11 is fastened with the through bolts, so that the pattern masks 13 and 13a, as well as the spacers 14 to 16 are integrated. Accordingly, the chips 1 can be securely held with respect to the pattern masks 13 and 13a with the through bolts.

It should be noted that the fixation of the pattern masks 13 and 13a as well as the spacers 14 to 16 may be achieved by use of another fixing means instead of the aforementioned through bolts. In addition, it is also possible that the through bolts be configured to function also as the positioning pins 31 for positioning the reference spacers 14a with respect to the pattern masks 13 and 13a. Moreover, the numbers and positions of the through bolts and the positioning pins 31 are not particularly limited.

The pattern masks 13 and 13a as well as the spacers 14 to 16 may be formed of a magnet or a magnetic metal, while these components may be substantially alternately stacked on one another. With this structure, the magnetic force improves the adhesion between each of the spacers 13 and 13a and the corresponding spacer pair 14 as well as the adhesion between each adjacent two of the spacers 14 and 16. Note that, when the adhesion due to the magnetic force is too strong, the magnetic force and the attraction due to the magnetic force can be controlled in the following way. Specifically, through holes may be formed as necessarily in the pattern masks 13 and 13a, or in the spacers 14 to 16. Alternatively, instead of forming the entire plate of a magnet or a magnetic body, it is possible to provide a magnet or a magnetic body plate to a part of the plate.

It is possible to form the pattern masks 13 and 13a as well as the spacers 14 to 16 of magnetic metal plates in the following manner. Firstly, these plates are made of, for example, metal plates (for example, any of various Fe alloys, or SUS430) including iron (Fe) as the main component. Then the film-forming openings 10, the through openings 20, and the cavity-forming portions 21 and 22 are formed by an etching process (a method of fabricating the reference spacers 14a and the offset spacers 14b will be described later). In addition, the pattern masks 13 and 13a as well as the spacers 14 to 16 can be formed of magnet plates by further magnetizing the above magnetic metal plates after the etching process. Moreover, even non-magnetic body plates (for example, non-magnetic stainless steel plates, and the like) may also be used as magnet plates by plating the plates with a magnetic material (for example, Ni). Furthermore, these pattern masks 13 and 13a as well as the spacers 14 to 16 may be fabricated also by an electroforming method or a precipitation method.

When the pattern masks 13 and 13a as well as the spacers 14 to 16 are formed of magnet plates, these plates may be coated with films. The provision of such a film makes it possible to prevent the magnet plates from being chipped due to repeated use of the masking apparatus 11, and to thus prevent the fragment of the magnet plates from adhering on the chip 1 or being mixed in an electrode to be formed. Examples of this film to be provided include a Ni film and a Cr film.

Moreover, various materials as given below can be used for the constituent materials of the pattern masks 13 and 13a as well as the spacers 14 to 16. Examples of such materials include a plate obtained by plating Cu with Ni, a Ni plate, a plate obtained by disposing SUS on the surface of a Ni plate, a plate obtained by forming a surface layer of a thermosetting resin (for example, fluorine or polyimide) on the surface of a Ni plate.

Figure 7:
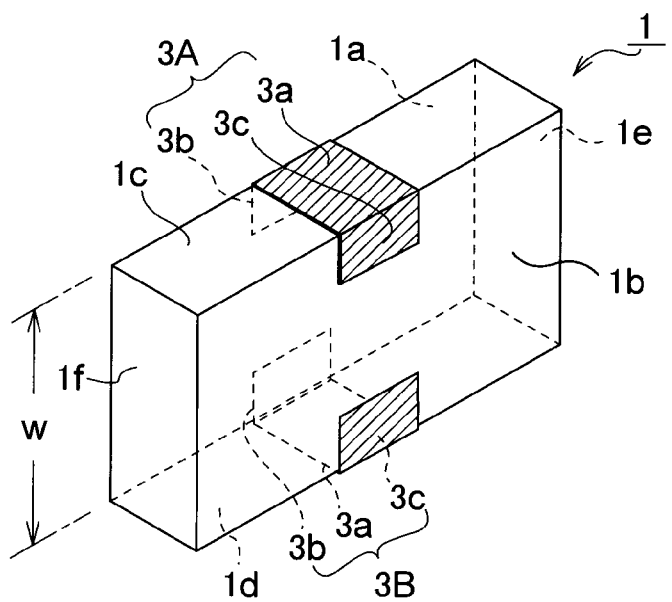
FIG. 7 is a perspective view showing another chip on which terminal electrodes are formed by using the masking apparatus according to the present invention.

Using a masking apparatus having a configuration similar to that of this embodiment also makes it possible, as shown in FIG. 7, to form similar terminal electrodes 3A and 3B on the side surfaces 1c and 1d (a pair of side surfaces opposite to each other in the longer-side direction) of the chip 1. Specifically, in the masking apparatus of the modified example, the reference spacer 14a and the offset spacer 14b, and the middle spacer as necessarily, may be stacked so that the thickness of the entire mask base body can be equal to the width dimension W of the end surfaces 1e and 1f of the chip 1. At the same time, the opening size of the cavity 25, as well as the shapes and dimensions of the film-forming groove 26, and of the film-forming opening 10 of each of the pattern masks 13 and 13a, may be modified in relation to the attitude of the chip 1 in which the side surfaces 1c and 1d of the chip 1 are arranged respectively on the upper and lower sides as shown in FIG. 7. Using such apparatus makes it possible to form, on the two side surface portions of the chip 1, the electrodes 3A and 3B each of which is continuously formed on the top surface 1a, on the side surface 1c (or 1d), and then on the bottom surface 1b, of the chip 1.

Second Embodiment

Figure 8:
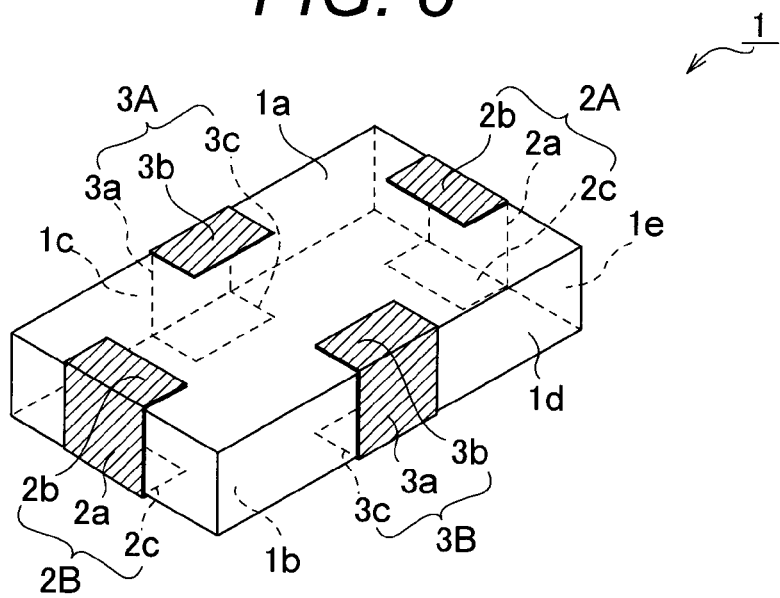
FIG. 8 is a perspective view showing a chip on which terminal electrodes are formed by using a masking apparatus according to a second embodiment of the present invention.

FIG. 8 shows a chip on which terminal electrodes are formed by using a masking apparatus according to a second embodiment of the present invention. As shown in FIG. 8, the masking apparatus according to the second embodiment is capable of forming terminal electrodes 2A, 2B, 3A, and 3B respectively on the two end surface portions and the two side surface portions of the chip 1 at once by sputtering. Here, each of the terminal electrodes 2A and 2B is formed continuously on the top surface 1a, on a corresponding one of the end surfaces 1e and 1f, and then on the bottom surface 1b, while each of the terminal electrodes 3A and 3B is formed continuously on the top surface 1a, on a corresponding one of the side surfaces 1c and 1d, and then on the bottom surface 1b.

Figure 9:
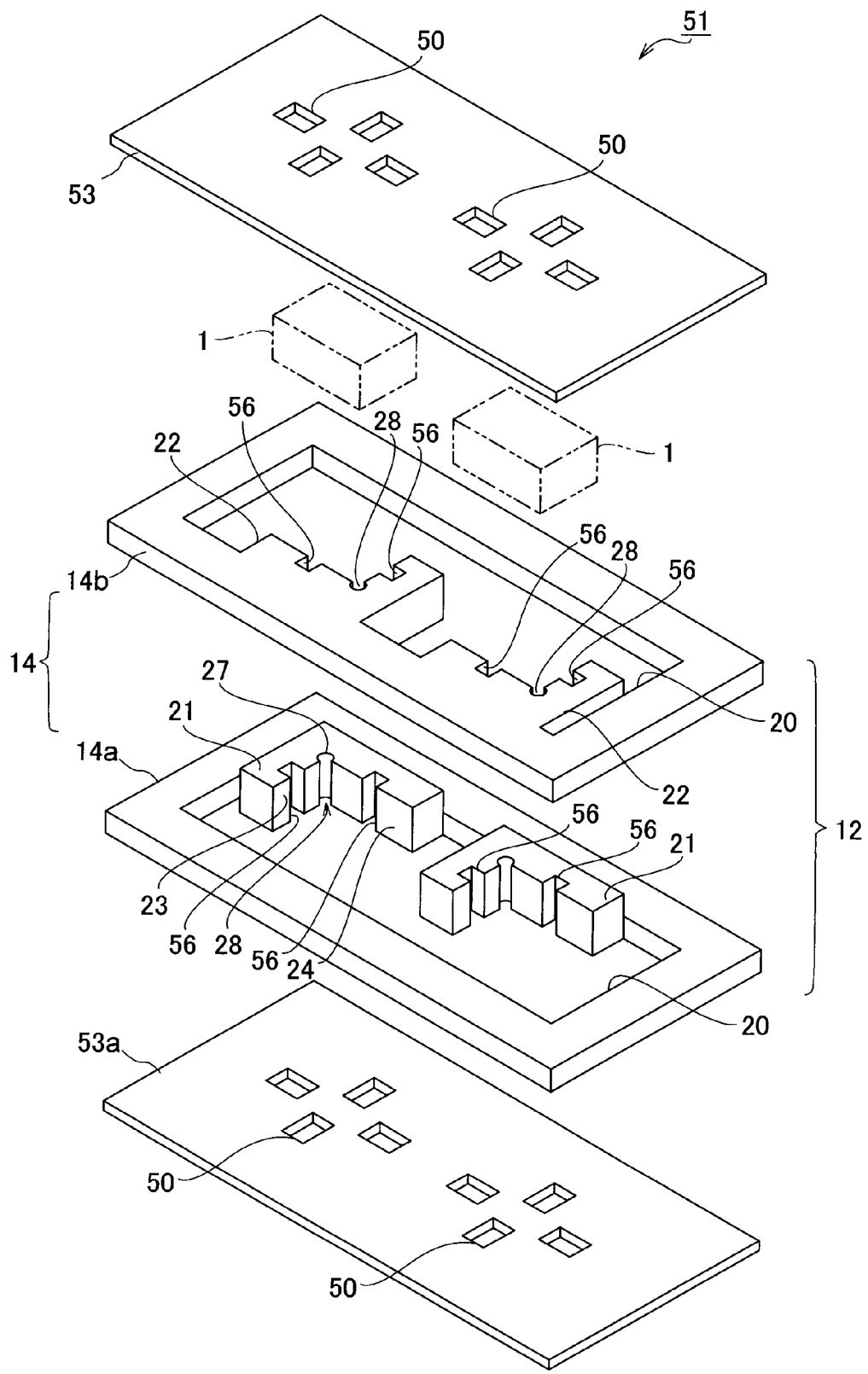
FIG. 9 is an exploded perspective view conceptually showing the masking apparatus according to the second embodiment.
Figure 10A:
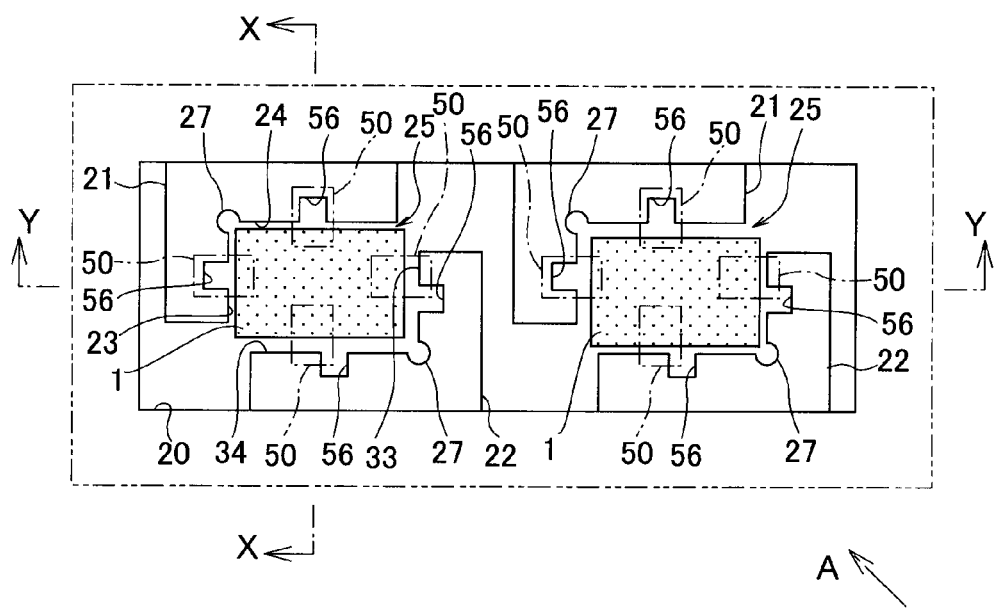
FIG. 10A is a plan view conceptually showing the masking apparatus (in a state where chips are loaded in cavities) according to the second embodiment.
Figure 10B:
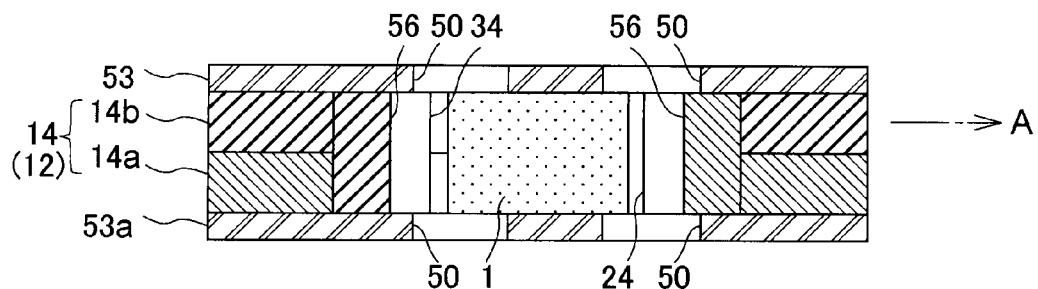
FIG. 10B is a cross-sectional view taken along the line X-X in FIG. 10A.
Figure 10C:
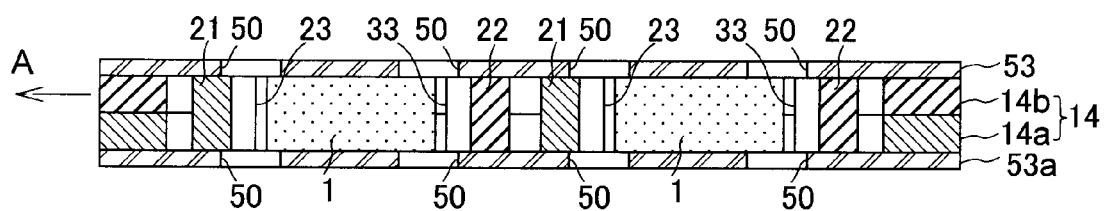
FIG. 10C is a cross-sectional view taken along the line Y-Y in FIG. 10A.
Figure 11A:
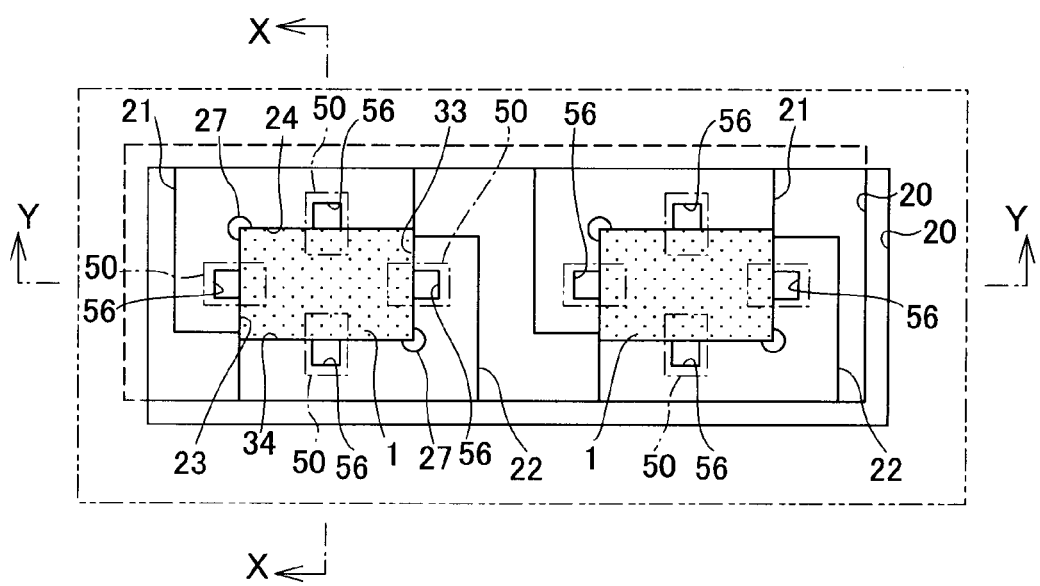
FIG. 11A is a plan view conceptually showing the masking apparatus (in a state where films are formed) according to the second embodiment.
Figure 11B:
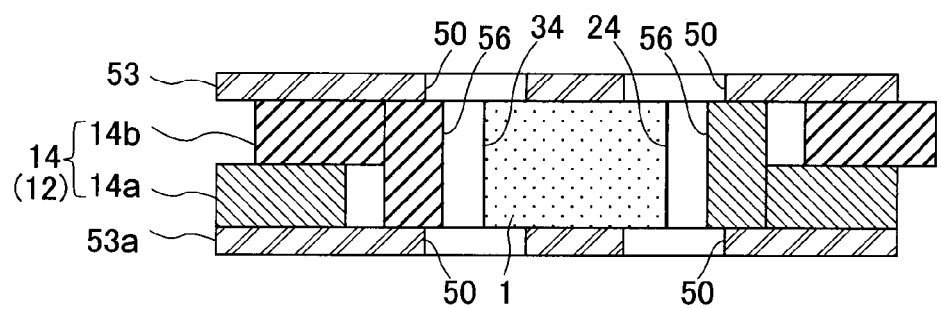
FIG. 11B is a cross-sectional view taken along the line X-X in FIG. 11A.
Figure 11C:
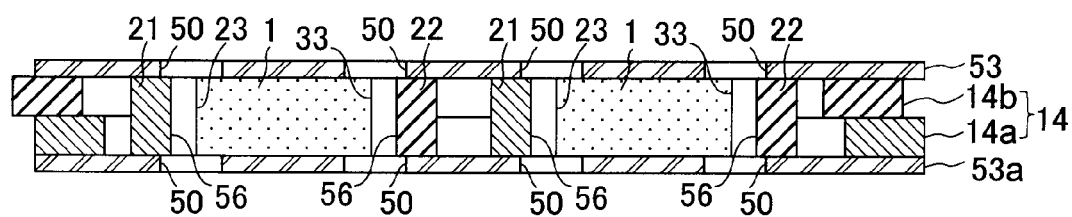
FIG. 11C is a cross-sectional view taken along the line Y-Y in FIG. 11A.

FIG. 9 is an exploded perspective view conceptually showing the masking apparatus according to the second embodiment. Each of FIGS. 10A to 10C shows a state where a chip is loaded in the masking apparatus. FIG. 10A is a plan view. FIG. 10B is a cross-sectional view taken along the line X-X in FIG. 10A while FIG. 10C is a cross-sectional view taken along the line Y-Y in FIG. 10A. Each of FIGS. 11A to 11C shows a state where films are formed by the masking apparatus. FIG. 11A is a plan view. FIG. 11B is a cross-sectional view taken along the line X-X in FIG. 11A while FIG. 11C is a cross-sectional view taken along the line Y-Y in FIG. 11A.

As shown in these figures, the masking apparatus 51 according to the second embodiment includes, as in the case of the apparatus 11 of the first embodiment, a mask base body 12, and pattern masks 53 and 53a. The chip 1 is housed in, and held by, the mask base body 12. The pattern masks 53 and 53a are disposed respectively on front and back surfaces of the mask base body 12. The mask base body 12 includes a reference spacer 14a and an offset spacer 14b. The relative position of the reference spacer 14a is fixed with respect to the pattern masks 53 and 53a, while the offset spacer 14b can be horizontally moved between a first horizontal position at the time of loading the chip 1 and a second horizontal position at the time when the chip 1 is positioned with respect to the pattern masks 53 and 53a.

It should be noted that, in the masking apparatus 51 according to this embodiment, the chip 1 is horizontally held (in a state where the top surface 1a and the bottom surface 1b face upward and downward, respectively). In this respect, the number of spacers arranged to form the mask base body 12 in the masking apparatus 51 is different from that of the first embodiment in order to meet the attitude (height) of the chip 1 housed in the masking apparatus 51. In other words, the number of spacers is set so that the peripheral surfaces (the side surfaces 1c and 1d, as well as the end surfaces 1e and 1f) of the chip 1 can be surrounded by the spacers while the chip 1 is held by the spacers. Specifically, the mask base body 12 is formed of a single positioning spacer pair 14 (one reference spacer 14a and one offset spacer 14b).

In addition, the number of film-forming grooves 56 provided in cavity-forming portions 21 and 22 of the reference spacer 14a and the offset spacer 14b is set to correspond to the number of terminal electrodes to be formed (4 in this example). Specifically, the film-forming groove 56 is provided in each of inside surfaces 23 and 24 of the cavity-forming portion 21 of the reference spacer 14a, while the film forming groove 56 is also provided in each of inside surfaces 33 and 34 of the cavity-forming portion 22 of the offset spacer 14b. The number of the film-forming grooves 56 provided to each cavity 25 is 4 in total.

Moreover, each of these film-forming grooves 56 is formed to be a penetrating groove extending from the upper surface to the lower surface of the corresponding cavity-forming portion 21 or 22 (across the total height of the corresponding cavity-forming portion 21 or 22). Accordingly, each film-forming groove 56 communicates with one of film-forming openings 50 formed in the pattern mask 53 on the upper surface side, as well as with a corresponding one of film-forming grooves 50 formed in the pattern mask 53a on the lower surface side. A sputtering material thus can be caused to enter into the film-forming grooves 56 from the corresponding film-forming openings 50 formed in the pattern masks 53 and 53a provided respectively on the upper and lower surfaces of the mask base body 12. This makes it possible to form the electrodes 2A and 2B on the end surfaces, each electrode connecting the electrode portion 2b on the top surface 1a of the chip 1 and the electrode portion 2c on the bottom surface 1b thereof, as well as to form the electrodes 3A and 3B on the side surfaces, each electrode connecting the electrode portion 3b on the top surface 1a of the chip 1 and the electrode portion 3c on the bottom surface 1b thereof.

The pattern masks 53 and 53a as well as the reference spacer 14a and the offset spacer 14b may be formed of magnet plates or magnetic body plates in a manner where these magnet plates and magnetic body plates are alternately stacked as in the case of the first embodiment.

The loading and positioning operations of the chips 1 to the masking apparatus 1 are performed in the same manner as those of the first embodiment. As shown in FIGS. 10A to 10C, the chips 1 are loaded in the respective cavities 25 in a state where the offset spacer 14b is located at the first horizontal position. Then, the pattern mask 53 on the upper surface side is placed on the top. Thereafter, as shown in FIGS. 11A to 11C, the offset spacer 14b is slid to the second horizontal position, so that the chips 1 are positioned with respect to the pattern masks 53 and 53a. The chips 1 are thus held in the respective cavities 25. In this state, each cavity-forming portion 21 of the reference spacer 14a abuts on two adjacent peripheral surfaces (one of the end surfaces 1e and 1f, and one of the side surfaces 1c and 1d) among the four peripheral surfaces of the corresponding chip 1, while the cavity-forming portion 22 of the offset spacer 14b abuts on the other two adjacent peripheral surfaces (the other one of the end surfaces 1e and 1f, and the other one of the side surfaces 1c and 1d) of the corresponding 1.

Figure 12:
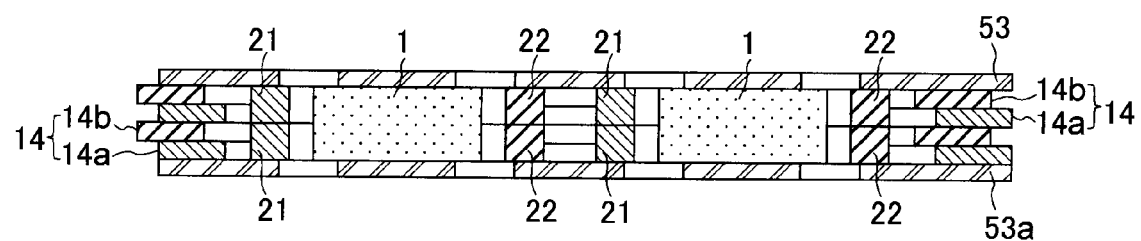
FIG. 12 is a cross-sectional view showing a modified example of the masking apparatus according to the second embodiment.
Figure 13:
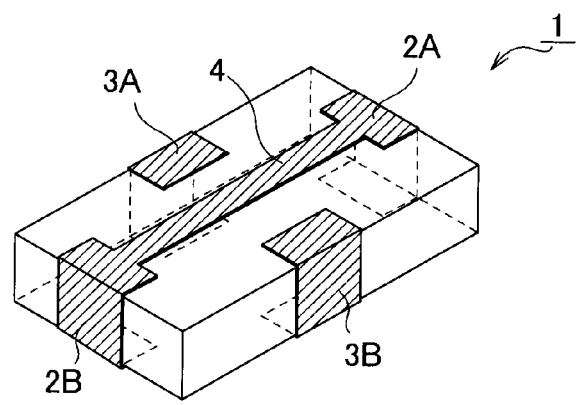
FIG. 13 is a perspective view showing still another chip on which terminal electrodes are formed by using the masking apparatus according to the present invention.

FIG. 12 shows a masking apparatus according to a modified example of the second embodiment. As shown in FIG. 12, it is also possible to provide two or more reference spacers 14a and two or more offset spacers 14b while each of these spacers is formed to have a smaller thickness. Moreover, as shown in FIG. 13, modifying the film-forming openings 50 of the pattern mask 53 makes it possible to form, for example, wiring 4 that connects the terminal electrodes 2A and 2B to each other, while forming of the electrodes.

Figure 15:
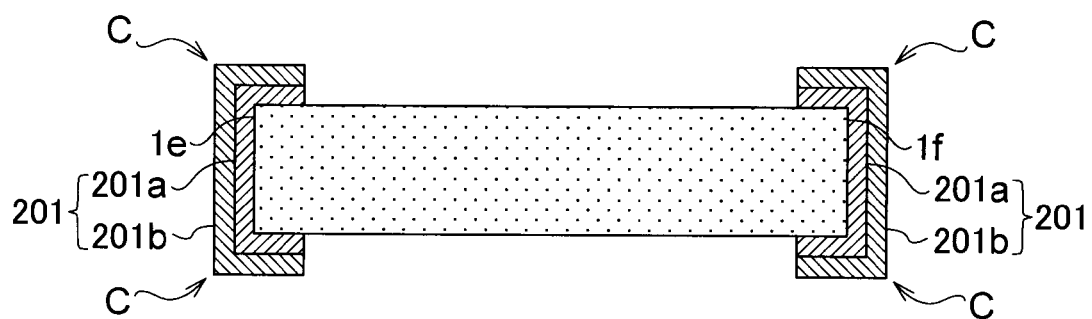
FIG. 15 is a cross-sectional view showing an example of the electronic component according to the present invention.

In addition, FIG. 15 is a cross-sectional view showing an example of an electronic component according to the present invention. As shown in FIG. 15, the electronic component 1 includes electrodes 201 (each formed of a first layer 201a and a second layer 201b). In addition, each of the electrodes 201 is continuously formed on a plurality of outer surfaces 1a, 1e (or 1f), and 1b, and especially does not have an interface at each corner portion C of an electronic component body 1A. By using the masking apparatus of the aforementioned embodiments, or by using a similar masking apparatus according to the present invention, it is possible to easily fabricate the electronic component 1 including such electrodes 201. Note that, the electronic component 1 shown in FIG. 15 includes the electrodes 201 each of which is continuously formed on the top surface 1a, on the end surface 1e (or 1f), and then on the bottom surface 1b (the three outer surfaces). However, the electrode 201 with no interface may be formed continuously on adjacent two outer surfaces, or continuously on four or more outer surfaces. The outer surfaces on which electrodes are formed are also not limited to this example, and electrodes may be formed on outer surfaces of any of various combinations.

Figure 16A:
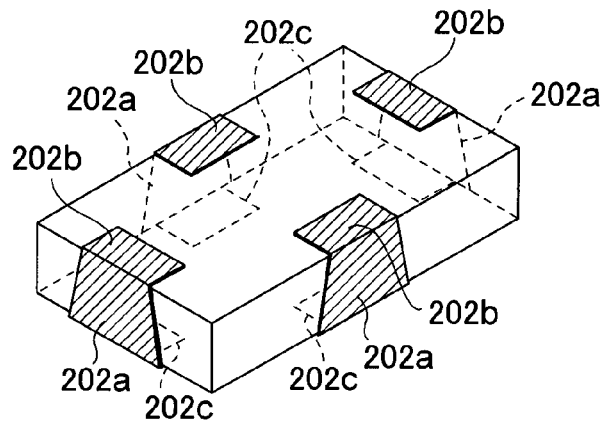
FIG. 16A is a perspective view showing an example of an electronic component having electrodes formed on the outer peripheral surfaces thereof by using the masking apparatus according to the present invention.
Figure 16B:
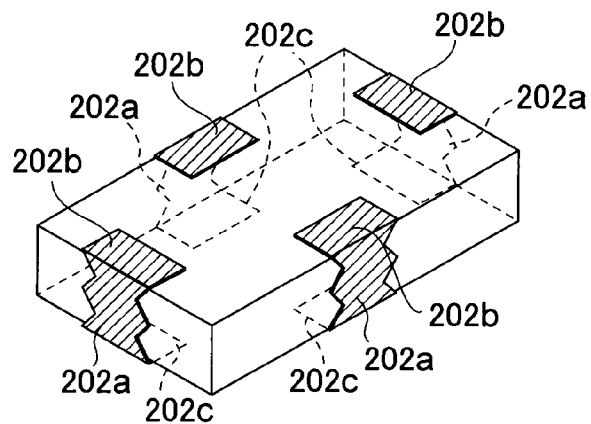
FIG. 16B is a perspective view showing another example of an electronic component having electrodes formed on the outer peripheral surface thereof by using the masking apparatus according to the present invention.
Figure 16C:
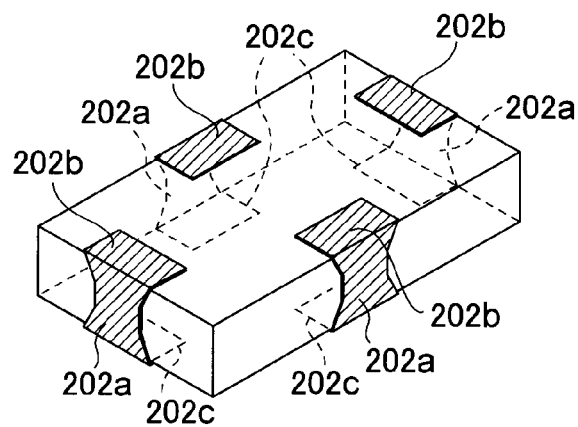
FIG. 16C is a perspective view showing still another example of an electronic component having electrodes formed on the outer peripheral surfaces thereof by using the masking apparatus according to the present invention.

Furthermore, each of FIGS. 16A to 16C shows a chip on which electrodes are formed by using the masking apparatus according to the present invention. In fabricating the electrodes (external structural bodies) of the chip in accordance with the present invention, as shown in FIGS. 16A to 16C, when an electrode portion 202a is formed on the peripheral surface of the chip by utilizing a film-forming groove, the electrode portion 202a sometimes has a side edge that is not formed in a straight vertical line but tapered. This is because the following reason. When a spacer (film-forming groove) is fabricated, the groove width of the film-forming groove does not tend to be made uniform along the direction of the height of the groove (so that the inside surfaces of the film-forming groove vertically extend), whereas the shape of the film-forming groove tends to be tapered. This tendency is significant, especially when the thickness dimension of the spacer is large, or when the film-forming groove is formed by an etching process. Accordingly, the peripheral electrode portion 202a formed by using the masking apparatus on the peripheral surface also has a tapered side edge corresponding to the tapered shape of the film-forming groove. It should be noted that, in each of FIGS. 16A to 16C, reference numerals 202b and 202c denote electrode portions respectively on the upper and lower surfaces of the chip on which a film-forming operation is performed through the film-forming openings of the pattern masks.

In addition, such tapered side edges may have various patterns, according to factors, such as the number of stacked spacers, the direction of tapered film-forming grooves (whether the grooves are tapered upwardly or downwardly). For example, suppose a case as the second embodiment in which the mask main body is configured of one spacer pair. In such case, one film-forming groove is not constituted of film-forming grooves formed respectively by a plurality of spacers, and connected to one another in the vertical direction, but one film-forming groove is simply constituted of one single film-forming groove formed by one spacer. In this a case, as shown in FIG. 16A, the electrode portion 202a may have a tapered edge that is continuous (straight) over the total height of the electrode portion 202a.

In addition, the electrode portion 202a may be partially tapered or may have a shape including a plurality of tapered side edges with different opening degrees (angles) of, or different directions of, the tapers, in accordance with the number of stacked spacers and with the directions of the tapered film-forming grooves, as shown in FIGS. 16B and 16C. Accordingly, tapered side edges with various patterns may be possibly formed other than these examples shown in FIGS. 16A to 16C. On the other hand, suppose the case of an electrode in which a peripheral electrode portion extends not over the total height, but to the middle, of the peripheral surface of the chip (for example, as in the case of the peripheral electrode portions 2b and 2c in FIG. 1). Even in this case, a tapered side edge may sometimes be formed in the electrode portions on the peripheral surface of the chip on which films are formed through film-forming grooves.

Method of Forming Spacers

The spacers (the reference spacers 14a and the offset spacers 14b) according to the second embodiment and the aforementioned first embodiment may be formed in the following manner.

Figure 14A:
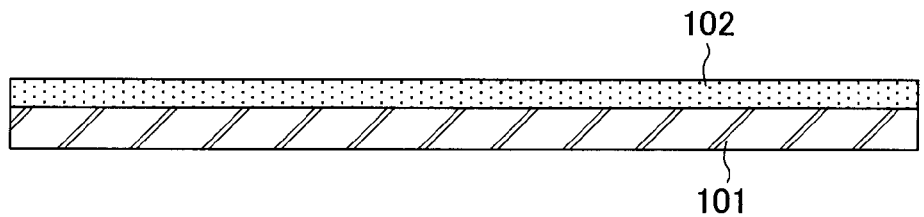
FIGS. 14A to 14G conceptually show, in order of processes, a method of fabricating the reference spacers and the offset spacers, included in the masking apparatus according to any of the aforementioned embodiments.
Figure 14B:
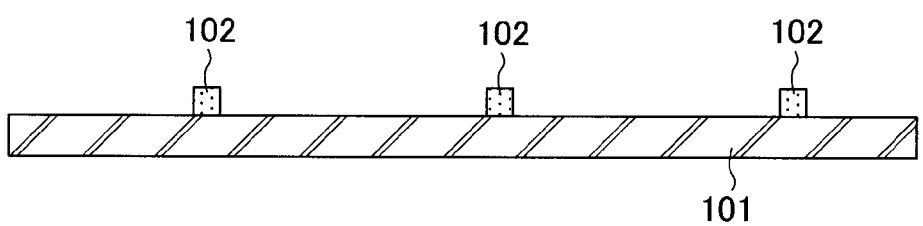
Figure 14C:
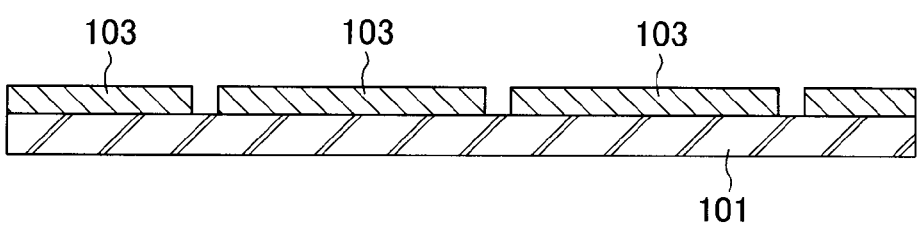
Figure 14D:
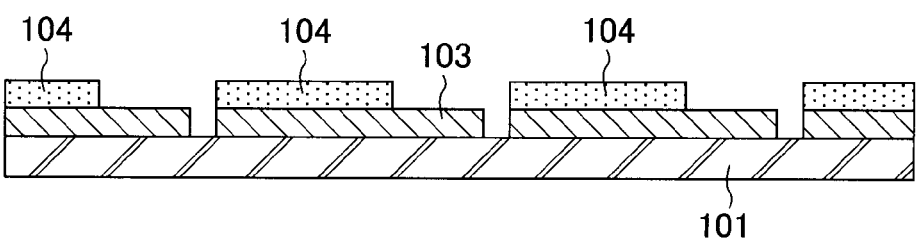

Now, refer to FIGS. 14A to 14G. Firstly, a master for electroforming the spacers 14a and 14b is prepared. A resist 102 is applied to the surface of a stainless steel plate 101 (FIG. 14A), and then a pattern for cavity-forming portions 21 and 22 is formed from the resist 102 through exposure and development (FIG. 14B). After that, a Cu film 103 is formed by plating Cu on the surface of the stainless steel plate 101 (FIG. 14C). Subsequently, a resist 104 is applied to the surface of the Cu film 103, and a pattern of through openings 20 on the surface of the Cu film 103 is formed from the resist 104 through exposure and development (FIG. 14D).

Figure 14E:
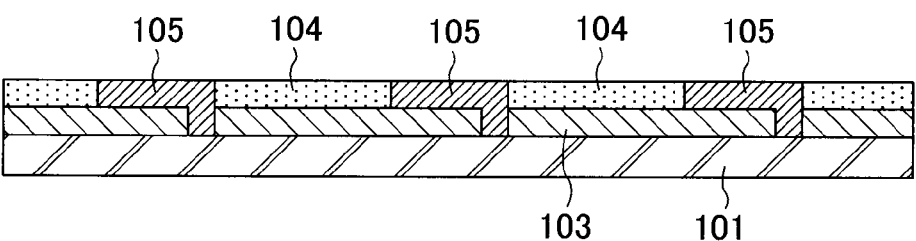
Figure 14F:
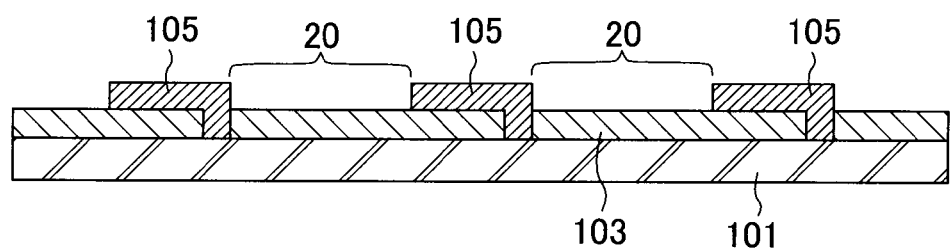
Figure 14G:
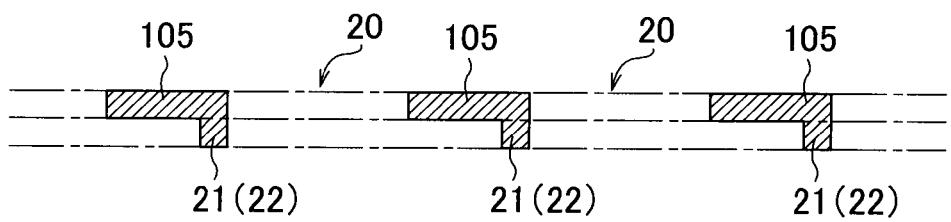

Then, using the master thus prepared, Ni 105 for forming the spacers 14a and 14b is precipitated, and then the spacers 14a and 14b provided with the cavity-forming portions 21 and 22 are formed by electroforming (FIG. 14E). The resist 104 is removed (FIG. 14F), and then the master (the stainless steel plate 101 and the Cu film 103) is stripped off. As a result, the spacer 14a (or 14b) including the cavity-forming portion 21 (or 22) is formed (FIG. 14G).

Fabrication of Electronic Component Using Masking Apparatus

An example of the fabrication of a chip by using the masking apparatus according to the first and second embodiments will be described below in order of processes.

(1) Predetermined functional elements are formed on regions where a chip is to be formed, of an assembly substrate. Then, chips are obtained by dicing (cutting) the assembly substrate, and are then washed and dried. Each chip is then loaded in the cavity of the masking apparatus of the first or second embodiment, and is positioned with respect to the pattern masks.

(2) The surface of the chip is cleaned from both of the upper and lower surface sides of the masking apparatus by reverse sputtering. Then, films are formed on the chip from the upper and lower surface sides by sputtering so that terminal electrodes (base electrodes) are formed. Thereafter, the chip is taken out from the masking apparatus. Note that, it is preferable that the sputtering be performed on both surfaces in this film-forming process because the number of processes can be reduced, and also because the electrode films can be formed continuously on the upper and lower surfaces as well as the peripheral surfaces. However, it is also possible that the film-forming process be performed twice (for example, in the case of using an apparatus capable of performing sputtering only on one surface side at once). In this case, sputtering is firstly performed on one surface (for example, the upper surface), and then sputtering is performed on the other surface side (for example, the lower surface). Even in this case, it is preferable that sputtering be performed after the surface is cleaned by reverse sputtering. Moreover, the electrode portions formed on the peripheral surfaces of the chip through the film-forming grooves 26 (or 56) by utilizing the spreading of the sputtering material tend to have a thickness smaller than those of the electrode portions formed on the upper and lower surfaces, of the chip, arranged to face the film-forming openings 10 (or 50) of the respective pattern masks. However, the thicknesses of the films to be formed (the time for the sputtering, or the amount of the sputtering material) may be set at values required for the electrode portions on the peripheral surfaces of the chip so that the electrodes can be formed at once without any problems.

(3) After the chip is washed and dried, conductive films (for example, Cu films) that will serve as the main bodies of the terminal electrodes are grown on the base electrodes by barrel plating.

(4) Electrode surface layers (for example, Ni films and Sn films) are formed on the surfaces of the conductive films by barrel plating in the same manner for the purpose of improving the solder wettability.

(5) Lastly, the chip 1 is washed and dried to complete the electronic component.

The following effects can be achieved as a whole by the present invention and the above-described embodiments.

(1) The number of processes for forming electrodes can be reduced. This makes it possible to improve the productivity of electronic components, and also to reduce the manufacturing costs thereof.

(2) An electrode that is continuous on a plurality of surfaces of a chip can be formed of a continuous film at once. This makes it possible to improve the electrical characteristics of the electronic component by reducing the internal resistance of the electrode, and concurrently to stabilize and enhance the adhesion strength of bonding portions.

(3) A chip can be easily loaded in a cavity, and also can be positioned accurately with respect to pattern masks. This makes it possible to enhance accuracies in the shape and dimensions of electrodes.

(4) Wiring and electrodes can be formed at once. Note that, although one electrode is formed on one peripheral surface in the above-described embodiments, it should be understood that the number, the shapes and the like of terminal electrodes can be changed by changing the number and shapes of the film-forming openings formed in the pattern masks as well as the number and shapes of the film-forming grooves formed in the cavity-forming portions. For example, it is also possible to form two or more electrodes on one peripheral surface, or to form a different number of electrodes with different shapes on each of the peripheral surfaces, the top surface, and the bottom surface.

What is claimed is:

1. A masking apparatus, comprising:
a mask base body including two or more spacer plates and a cavity to house an electronic component; and
a mask plate disposed on at least one of an upper surface and a lower surface of the mask base body, the mask plate including a film-forming opening having a shape corresponding to a shape of an external structural body to be formed on an outer surface of
the electronic component, the mask plate allowing a film-forming operation to be selectively performed on the outer surface of the electronic component through the film-forming opening so that the external structural body can be formed, wherein the cavity has a depth substantially equal to a height of the electronic component in a state where the film is to be formed, so as to surround a periphery of the electronic component housed therein, the cavity includes, in an inner surface thereof, a film-forming groove communicating with the film-forming opening so that the external structural body can be formed at once both on at least one of an upper and a lower surfaces of, and on a peripheral surface of, the electronic component in the state where the film is to be formed, the two or more spacer plates including at least first and second spacer plates, each of which has a cavity-forming portion for forming the cavity, and which are stacked on each other in a thickness direction of the mask base body, the cavity is formed by the cavity-forming portions of the spacer plates, at least one of the cavity-forming portions of the first and the second spacer plates includes the film-forming groove, one of the first and second spacer plates is a reference spacer plate for horizontally positioning the electronic component in the cavity, the cavity-forming portion of the reference spacer plate including a first reference inner surface and a second reference inner surface intersecting each other to form a reference corner portion, and a relative position of the reference spacer plate with respect to the mask plate being fixed, an other one of the first and second spacer plates is an offset spacer plate which is arranged to be slidable in a horizontal direction, and which presses, by using the cavity-forming portion thereof, the electronic component housed in the cavity to horizontally move the electronic component in the cavity, by moving the offset spacer plate in a direction from the center portion of the cavity toward the reference corner portion, the electronic component is pressable against the reference corner portion formed by the first and second reference inner surfaces to be positioned with respect to the mask plate, the first and second spacer plates each include a plate-shaped spacer main body portion and a through opening, the spacer main body portions being stacked on each other in the thickness direction of the mask base body, and the through openings penetrating the respective spacer main body portions, the cavity-forming portions of the first and second spacer plates are arranged to horizontally protrude into a forming region of the through openings to form the cavity in the through openings, each of the first and second spacer plates includes two or more of the cavity-forming portions, and the two or more cavity-forming portions are arranged to horizontally protrude into the forming region of the same through opening, so that two or more of the cavities are formed in the through opening.

2. The masking apparatus according to claim 1, wherein the film-forming groove has a depth corresponding to the length of the external structural body to be formed on the peripheral surface of the electronic component in the state where the film is to be formed.

3. The masking apparatus according to claim 1, wherein
the mask plate is disposed on each of the upper and lower surfaces of the mask base body, and
the film-forming groove communicates with each of the film-forming openings of the respective mask plates arranged on the upper and lower surfaces of the mask base body, and penetrates the mask base body.

4. The masking apparatus according to claim 1, wherein the side surfaces of the cavity-forming portions, protruding in the forming region of the through openings to abut on the corresponding peripheral surfaces of the electronic component housed in the cavity, of the first and second spacer plates have substantially the same height dimension, and are arranged at substantially the same height.

5. The masking apparatus according to claim 1, wherein each of the mask and spacer plates is made of any one of a magnet plate and a magnetic body plate, the magnet plate including a magnet in at least a part thereof, and the magnetic body plate including, in at least a part thereof, a magnetic body which is attracted by the magnet.

6. The masking apparatus according to claim 5, further comprising a film which covers the magnet.

7. The masking apparatus according to claim 1, wherein each of the mask and spacer plates is made of any one of a magnet plate and a magnetic body plate so that the magnetic body plate and the magnet plate are alternately stacked on each other.

8. The masking apparatus according to claim 7, further comprising a film which covers the magnet.

9. The masking apparatus according to claim 1, wherein a notch groove extending across an entire height of the cavity-forming portion is formed in the reference corner portion.

10. The masking apparatus according to claim 9, wherein the film-forming groove has a depth corresponding to the length of the external structural body to be formed on the peripheral surface of the electronic component in the state where the film is to be formed.

11. The masking apparatus according to claim 9, wherein
the mask plate is disposed on each of the upper and lower surfaces of the mask base body, and
the film-forming groove communicates with each of the film-forming openings of the respective mask plates arranged on the upper and lower surfaces of the mask base body, and penetrates the mask base body.

12. The masking apparatus according to claim 9, wherein each of the mask and spacer plates is made of any one of a magnet plate and a magnetic body plate, the magnet plate including a magnet in at least a part thereof, and the magnetic body plate including, in at least a part thereof, a magnetic body which is attracted by the magnet.

13. The masking apparatus according to claim 9, wherein each of the mask and spacer plates is made of any one of a magnet plate and a magnetic body plate so that the magnetic body plate and the magnet plate are alternately stacked on each other.

* * * * *